(12) United States Patent     (10) Patent No.:   US 12,643,300 B2

Hayden et al.     (45) Date of Patent:    Jun. 2, 2026

(54) SYSTEMS AND METHODS FOR MANUFACTURING ROTOR BLADES

(71) Applicants: LM Wind Power A/S, Kolding (DK); Paul Hayden, Romsey (GB); Huijuan Dai, Simpsonville, SC (US); Stefaan Guido Van Nieuwenhove, Medemblik (NL); Ryan Eric Vogel, Greer, SC (US); Mark Hancock, Eastleigh (GB); Torben Krogsdal Jacobsen, Lunderskov (DK)

(72) Inventors: Paul Hayden, Romsey (GB); Huijuan Dai, Simpsonville, SC (US); Stefaan Guido Van Nieuwenhove, Medemblik (NL); Ryan Eric Vogel, Greer, SC (US); Mark Hancock, Eastleigh (GB); Torben Krogsdal Jacobsen, Lunderskov (DK)

(73) Assignee: LM Wind Power A/S, Kolding (DK)

( * ) Notice: Subject to any disclaimer, the term of this patent is extended or adjusted under 35 U.S.C. 154(b) by 127 days.

(21) Appl. No.: 18/553,668

(22) PCT Filed: Apr. 1, 2022

(86) PCT No.: PCT/US2022/023031
§ 371 (c)(1),
(2) Date: Oct. 2, 2023

(87) PCT Pub. No.: WO2022/212829
PCT Pub. Date: Oct. 6, 2022

(65) Prior Publication Data
US 2024/0181733 A1    Jun. 6, 2024

Related U.S. Application Data

(60) Provisional application No. 63/170,120, filed on Apr. 2, 2021.

(51) Int. Cl.
*B29D 99/00*     (2010.01)
*B29B 17/00*     (2006.01)
(Continued)

(52) U.S. Cl.
CPC ...... *B29D 99/0028* (2013.01); *B29B 17/0005* (2013.01); *B29C 70/06* (2013.01);
(Continued)

(58) Field of Classification Search
CPC ......... B29C 70/06; B29C 70/28; B29C 70/30; B29C 70/302; B29C 70/304;
(Continued)

(56) References Cited

U.S. PATENT DOCUMENTS 2,884,078 A    4/1959   Stamm et al.
4,045,269 A    8/1977   Voss et al.
(Continued)

FOREIGN PATENT DOCUMENTS

AU    2011304537 B2    3/2012
CA      2517951 A1    9/2004
(Continued)

OTHER PUBLICATIONS

PCT International Search Report & Opinion Corresponding to PCT/US2022/023031 on Sep. 9, 2022.

*Primary Examiner* — Andrew L Swanson
(74) *Attorney, Agent, or Firm* — Dority & Manning, P.A.

(57) ABSTRACT

A method for manufacturing an article includes providing a plurality of flat sheets of fiber-reinforced polymer material. The method also includes forming the plurality of flat sheets of the fiber-reinforced polymer material into a plurality of curved sheets of the fiber-reinforced polymer material. Further, the method includes assembling the plurality of curved sheets of the fiber-reinforced polymer material in a tooling device to form an outer shape of the article. Moreover, the (Continued)

method includes securing each of the plurality of curved sheets of the fiber-reinforced polymer material together to form the article.

16 Claims, 21 Drawing Sheets

(51) Int. Cl.

| | |
|---|---|
| *B29C 70/06* | (2006.01) |
| *B29C 70/46* | (2006.01) |
| *B29C 70/54* | (2006.01) |
| *B29L 31/08* | (2006.01) |

(52) U.S. Cl.
CPC ............ *B29C 70/46* (2013.01); *B29C 70/545* (2013.01); *B29L 2031/085* (2013.01)

(58) Field of Classification Search
CPC ..... B29C 70/305; B29C 70/34; B29C 70/342; B29C 70/345; B29C 70/347; B29C 70/46; B29C 70/545; B29D 99/0028; B29B 17/0005; B29L 2031/085
See application file for complete search history.

(56) References Cited

U.S. PATENT DOCUMENTS

| | | | |
|---|---|---|---|
| 4,329,119 | A | 5/1982 | Baskin |
| 4,474,536 | A | 10/1984 | Gougeon et al. |
| 4,976,587 | A | 12/1990 | Johnston et al. |
| 5,476,704 | A | 12/1995 | Köhler |
| 6,264,877 | B1 | 7/2001 | Pallu De La Barriere |
| 7,473,385 | B2 | 1/2009 | Stiesdal et al. |
| 7,503,752 | B2 | 3/2009 | Gunneskov et al. |
| 7,625,185 | B2 | 12/2009 | Wobben |
| 7,637,721 | B2 | 12/2009 | Driver et al. |
| 7,654,799 | B2 | 2/2010 | Eyb |
| 7,854,594 | B2 | 12/2010 | Judge |
| 7,922,454 | B1 | 4/2011 | Riddell |
| 8,043,065 | B2 | 10/2011 | Kyriakides |
| 8,057,189 | B2 | 11/2011 | Riahi |
| 8,079,818 | B2 | 12/2011 | Burchardt et al. |
| 8,114,329 | B2 | 2/2012 | Karem |
| 8,142,162 | B2 | 3/2012 | Godsk et al. |
| 8,147,209 | B2 | 4/2012 | Godsk et al. |
| 8,168,027 | B2 | 5/2012 | Jacobsen et al. |
| 8,172,538 | B2 | 5/2012 | Hancock et al. |
| 8,177,514 | B2 | 5/2012 | Hibbard |
| 8,262,361 | B2 | 9/2012 | Sanz Pascual et al. |
| 8,297,932 | B2 | 10/2012 | Arocena De La Rua et al. |
| 8,297,933 | B2 | 10/2012 | Riahi |
| 8,317,479 | B2 | 11/2012 | Vronsky et al. |
| 8,348,622 | B2 | 1/2013 | Bech |
| 8,353,674 | B2 | 1/2013 | Bech |
| 8,455,090 | B2 | 6/2013 | Schmidt et al. |
| 8,506,258 | B2 | 8/2013 | Baker et al. |
| 8,511,996 | B2 | 8/2013 | Llorente Gonzalez et al. |
| 8,517,689 | B2 | 8/2013 | Kyriakides et al. |
| 8,540,491 | B2 | 9/2013 | Gruhn et al. |
| 8,545,744 | B2 | 10/2013 | Jones |
| 8,580,060 | B2 | 11/2013 | Bech |
| 8,657,581 | B2 | 2/2014 | Pilpel et al. |
| 8,673,106 | B1 | 3/2014 | Jolley et al. |
| 8,696,317 | B2 | 4/2014 | Rudling |
| 8,747,098 | B1 | 6/2014 | Johnson et al. |
| 8,764,401 | B2 | 7/2014 | Hayden et al. |
| 8,826,534 | B2 | 9/2014 | Cappelli et al. |
| 8,827,655 | B2 | 9/2014 | Bech |
| 8,894,374 | B2 | 11/2014 | Fuglsang et al. |
| 8,918,997 | B2 | 12/2014 | Kyriakides et al. |
| 8,961,142 | B2 | 2/2015 | Wansink |
| 8,961,143 | B2 | 2/2015 | Kulenkampff et al. |
| 8,992,813 | B2 | 3/2015 | Robbins et al. |
| 9,790,919 | B2 | 10/2017 | Leonard et al. |
| 10,337,490 | B2 | 7/2019 | Caruso et al. |
| 10,487,797 | B2 | 11/2019 | Hancock et al. |
| 10,513,810 | B2 | 12/2019 | Ramachandran et al. |
| 10,947,852 | B2 | 3/2021 | Schuring |
| 11,092,132 | B2 | 8/2021 | Quiring et al. |
| 11,118,561 | B2 | 9/2021 | Randall |
| 2006/0225278 | A1 | 10/2006 | Lin et al. |
| 2007/0036659 | A1 | 2/2007 | Hibbard |
| 2009/0148300 | A1 | 6/2009 | Driver et al. |
| 2010/0043955 | A1 | 2/2010 | Hornick et al. |
| 2010/0098549 | A1 | 4/2010 | Mironov |
| 2010/0119374 | A1 | 5/2010 | Wood |
| 2010/0303631 | A1 | 12/2010 | Payne et al. |
| 2011/0031758 | A1 | 2/2011 | Mitsuoka et al. |
| 2011/0037191 | A1 | 2/2011 | Stiesdal |
| 2011/0045276 | A1 | 2/2011 | Grove-Nielsen |
| 2011/0081248 | A1 | 4/2011 | Hibbard |
| 2011/0103962 | A1 | 5/2011 | Hayden et al. |
| 2011/0114252 | A1 | 5/2011 | Partington et al. |
| 2011/0142662 | A1 | 6/2011 | Fritz et al. |
| 2011/0142670 | A1 | 6/2011 | Pilpel et al. |
| 2011/0206529 | A1 | 8/2011 | Bell et al. |
| 2011/0243750 | A1 | 10/2011 | Gruhn et al. |
| 2011/0318186 | A1 | 12/2011 | Kristensen et al. |
| 2012/0034096 | A1 | 2/2012 | Appleton |
| 2012/0039720 | A1 | 2/2012 | Bech |
| 2012/0148404 | A1 | 6/2012 | Quell et al. |
| 2012/0180582 | A1 | 7/2012 | Piasecki |
| 2012/0183408 | A1 | 7/2012 | Noerlem |
| 2012/0230830 | A1 | 9/2012 | Lind et al. |
| 2012/0237356 | A1 | 9/2012 | Mironov |
| 2012/0257984 | A1 | 10/2012 | Frederiksen |
| 2012/0294724 | A1 | 11/2012 | Broome et al. |
| 2013/0012086 | A1 | 1/2013 | Jones et al. |
| 2013/0022466 | A1 | 1/2013 | Laurberg |
| 2013/0108453 | A1 | 5/2013 | Baker et al. |
| 2013/0149166 | A1 | 6/2013 | Schibsbye |
| 2013/0164133 | A1 | 6/2013 | Grove-Neilsen |
| 2013/0195661 | A1 | 8/2013 | Lind et al. |
| 2013/0231018 | A1 | 9/2013 | Kruger et al. |
| 2013/0333823 | A1 | 12/2013 | Hedges et al. |
| 2014/0003955 | A1 | 1/2014 | Richter |
| 2014/0003956 | A1 | 1/2014 | Lull et al. |
| 2014/0023513 | A1 | 1/2014 | Johnson et al. |
| 2014/0030094 | A1 | 1/2014 | Dahl et al. |
| 2014/0119936 | A1 | 5/2014 | Dahl et al. |
| 2014/0140855 | A1 | 5/2014 | Arendt et al. |
| 2014/0271217 | A1 | 9/2014 | Baker |
| 2014/0295187 | A1 | 10/2014 | Jacobsen et al. |
| 2014/0301859 | A1 | 10/2014 | Hancock et al. |
| 2014/0348659 | A1 | 11/2014 | Stewart |
| 2015/0003991 | A1 | 1/2015 | Bagepalli et al. |
| 2015/0209982 | A1* | 7/2015 | Kutsuwada ............. B29C 43/18 264/250 |
| 2015/0224760 | A1 | 8/2015 | Eyb et al. |
| 2015/0266249 | A1* | 9/2015 | Booth ................... B29C 51/105 264/263 |
| 2015/0316023 | A1 | 11/2015 | Sandercock et al. |
| 2015/0316028 | A1 | 11/2015 | Brekenfeld |
| 2016/0090209 | A1 | 3/2016 | Brisendine et al. |
| 2016/0348642 | A1* | 12/2016 | Hayden ................. F03D 1/0675 |
| 2016/0377052 | A1 | 12/2016 | Caruso et al. |
| 2018/0147778 | A1* | 5/2018 | Parkinson ............. B29C 70/388 |
| 2019/0152128 | A1 | 5/2019 | Tobin |
| 2019/0275707 | A1 | 9/2019 | Ahmed |
| 2020/0080543 | A1* | 3/2020 | Warchol ................. F03D 13/10 |
| 2021/0047788 | A1 | 2/2021 | Conrad |
| 2021/0102523 | A1* | 4/2021 | Smith ................... B29C 66/112 |

FOREIGN PATENT DOCUMENTS

| | | |
|---|---|---|
| CA | 2526407 | 12/2004 |
| CN | 201155423 Y | 11/2008 |
| CN | 100476200 C | 4/2009 |
| CN | 101302302 B | 2/2011 |
| CN | 102705157 A | 10/2012 |
| CN | 101906251 B | 6/2013 |
| DE | 102011051172 A | 12/2012 |
| DE | 102012019351 A1 | 4/2014 |

(56)　　　　　References Cited

FOREIGN PATENT DOCUMENTS

| | | | | | |
|---|---|---|---|---|---|
| DK | 201270816 | A | 1/2014 | | |
| DK | 201270818 | A | 1/2014 | | |
| DK | 3505751 | T3 | 4/2021 | | |
| EP | 2113373 | B1 | 1/2011 | | |
| EP | 2255957 | B1 | 7/2013 | | |
| EP | 2617558 | A1 | 7/2013 | | |
| EP | 2679804 | A1 | 1/2014 | | |
| EP | 2679806 | A1 | 1/2014 | | |
| EP | 2682256 | A1 | 1/2014 | | |
| EP | 2687557 | A1 | 1/2014 | | |
| EP | 2455419 | B1 | 3/2014 | | |
| EP | 1808598 | B1 | 4/2014 | | |
| EP | 2752577 | A2 | 7/2014 | | |
| EP | 2778393 | A2 | 9/2014 | | |
| EP | 3155159 | B1 * | 4/2018 | .......... | B29C 65/481 |
| GB | 2451192 | A | 1/2009 | | |
| GB | 2455044 | A | 6/2009 | | |
| GB | 2464539 | A | 4/2010 | | |
| GB | 2485453 | A | 5/2012 | | |
| JP | 2002137307 | A | 5/2002 | | |
| JP | 2007092716 | A | 4/2007 | | |
| JP | 3930200 | B2 | 6/2007 | | |
| JP | 2009235306 | A | 10/2009 | | |
| JP | 2014015567 | A | 1/2014 | | |
| JP | 5439412 | B2 | 3/2014 | | |
| WO | WO-0226463 | A2 * | 4/2002 | .......... | B29C 70/465 |
| WO | WO03082551 | A1 | 10/2003 | | |
| WO | WO2007/051465 | A1 | 5/2007 | | |
| WO | WO2008/086805 | A2 | 4/2008 | | |
| WO | WO2009/118545 | A1 | 10/2009 | | |
| WO | WO2010/025830 | A2 | 3/2010 | | |
| WO | WO2010/057502 | A2 | 5/2010 | | |
| WO | WO2010/083921 | A2 | 7/2010 | | |
| WO | WO2011/088834 | A2 | 7/2011 | | |
| WO | WO2011/088835 | A2 | 7/2011 | | |
| WO | WO2011/098785 | A2 | 8/2011 | | |
| WO | WO2011/113812 | A1 | 9/2011 | | |
| WO | WO2012/010293 | A1 | 1/2012 | | |
| WO | WO2012/042261 | A1 | 4/2012 | | |
| WO | WO2012/140039 | A2 | 10/2012 | | |
| WO | WO2012/161741 | A2 | 11/2012 | | |
| WO | WO2013/007351 | A1 | 1/2013 | | |
| WO | WO2013/060582 | A1 | 5/2013 | | |
| WO | WO2013/087078 | A1 | 6/2013 | | |
| WO | WO2013/091639 | A2 | 6/2013 | | |
| WO | WO2013/178228 | A1 | 12/2013 | | |
| WO | WO2014/001537 | A1 | 1/2014 | | |
| WO | WO2014/044280 | A1 | 3/2014 | | |
| WO | WO2014/063944 | A1 | 5/2014 | | |
| WO | WO2014/079456 | A1 | 5/2014 | | |
| WO | WO2014/079565 | A2 | 5/2014 | | |
| WO | WO2015/015202 | A1 | 2/2015 | | |
| WO | WO2018/055063 | A1 | 3/2018 | | |
| WO | WO-2019103825 | A2 * | 5/2019 | ............ | B29C 51/10 |

* cited by examiner

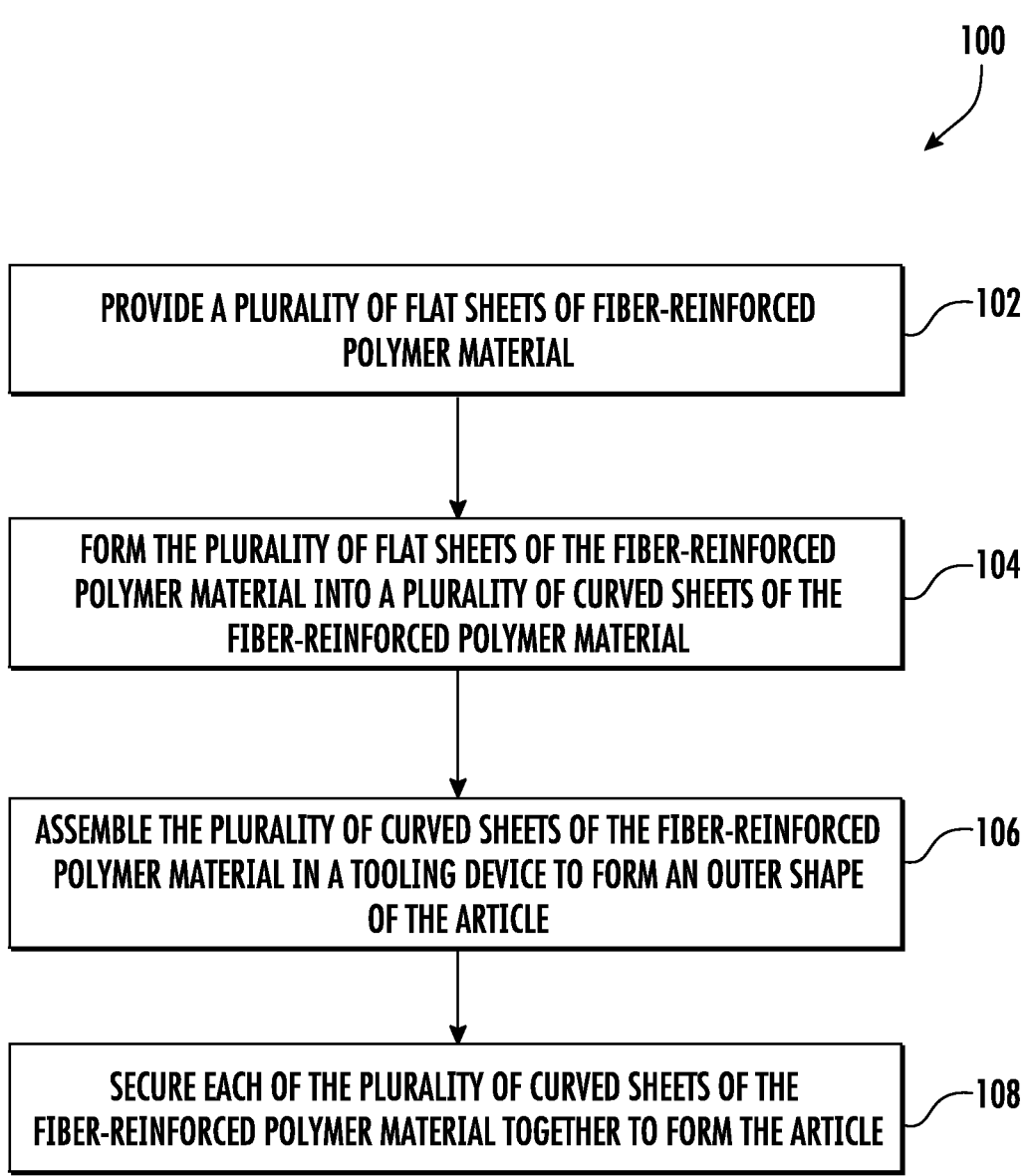

*100*

| PROVIDE A PLURALITY OF FLAT SHEETS OF FIBER-REINFORCED POLYMER MATERIAL | 102 |

| FORM THE PLURALITY OF FLAT SHEETS OF THE FIBER-REINFORCED POLYMER MATERIAL INTO A PLURALITY OF CURVED SHEETS OF THE FIBER-REINFORCED POLYMER MATERIAL | 104 |

| ASSEMBLE THE PLURALITY OF CURVED SHEETS OF THE FIBER-REINFORCED POLYMER MATERIAL IN A TOOLING DEVICE TO FORM AN OUTER SHAPE OF THE ARTICLE | 106 |

| SECURE EACH OF THE PLURALITY OF CURVED SHEETS OF THE FIBER-REINFORCED POLYMER MATERIAL TOGETHER TO FORM THE ARTICLE | 108 |

*FIG. 8*

PREPREG
SUPPLY

BACKING
MATERIAL
PICKUP

CUTTER(S)

HEAT
SOURCE

LAYUP DIRECTION

200

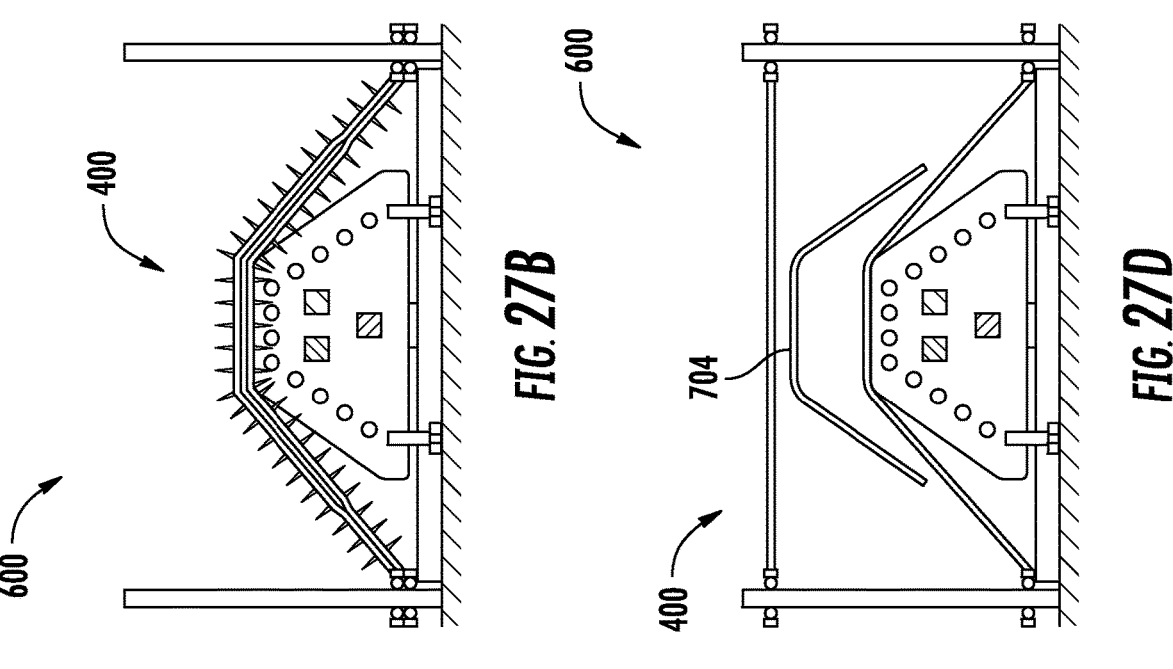
FIG. 27A
FIG. 27B
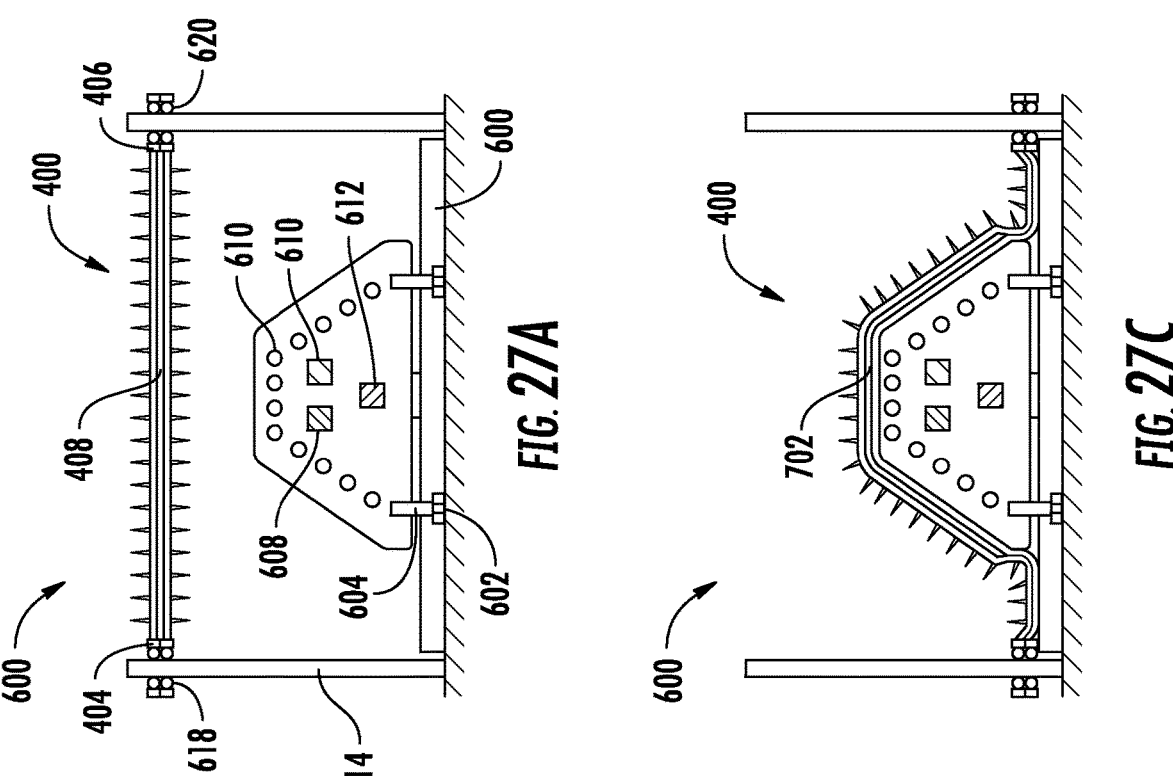
FIG. 27C
FIG. 27D

800

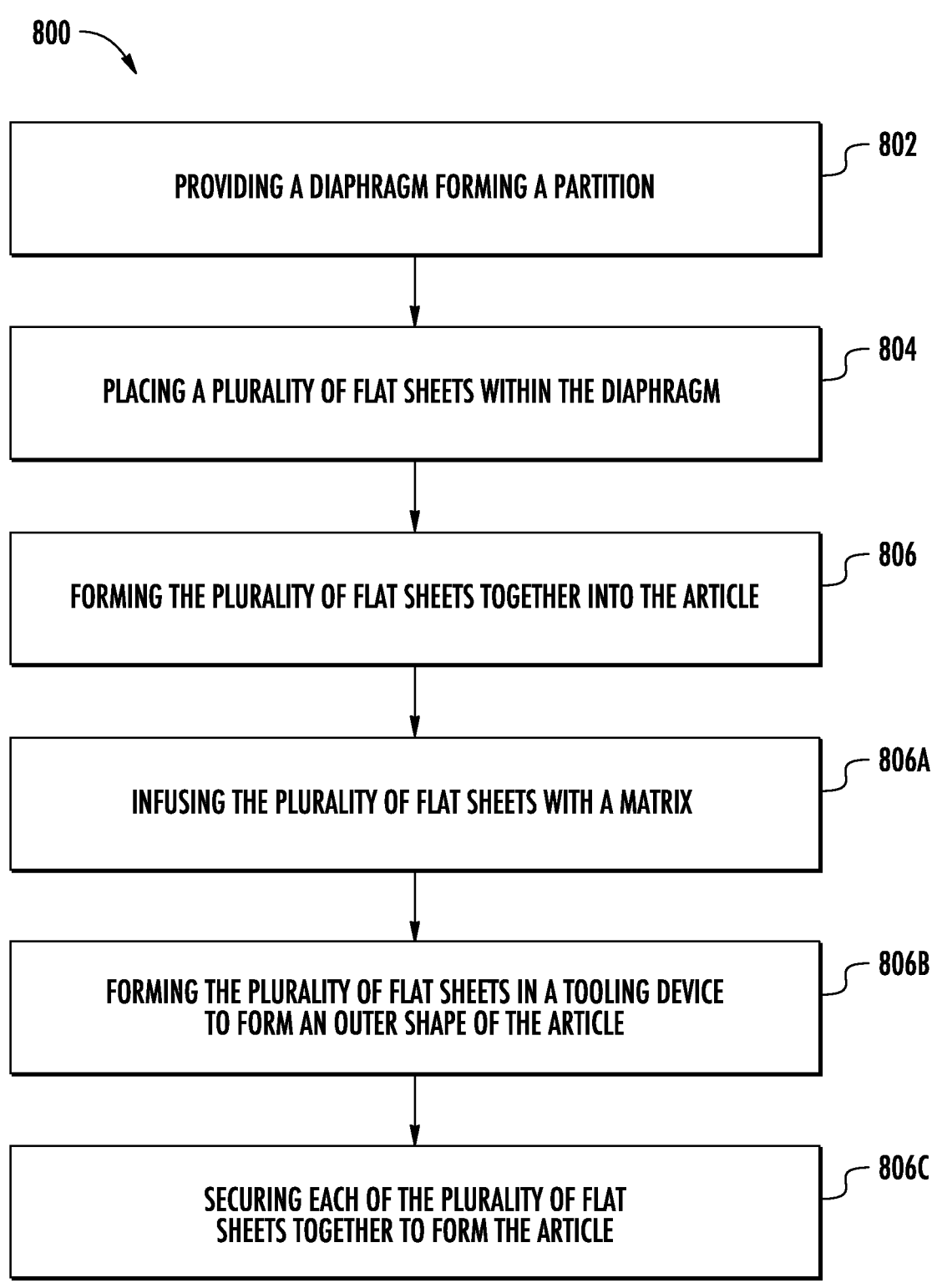

PROVIDING A DIAPHRAGM FORMING A PARTITION — 802

PLACING A PLURALITY OF FLAT SHEETS WITHIN THE DIAPHRAGM — 804

FORMING THE PLURALITY OF FLAT SHEETS TOGETHER INTO THE ARTICLE — 806

INFUSING THE PLURALITY OF FLAT SHEETS WITH A MATRIX — 806A

FORMING THE PLURALITY OF FLAT SHEETS IN A TOOLING DEVICE TO FORM AN OUTER SHAPE OF THE ARTICLE — 806B

SECURING EACH OF THE PLURALITY OF FLAT SHEETS TOGETHER TO FORM THE ARTICLE — 806C

FIG. 28

SYSTEMS AND METHODS FOR MANUFACTURING ROTOR BLADES

CROSS-REFERENCE TO RELATED APPLICATIONS

This application claims the benefit of U.S. Provisional Patent Application No.: 63/170,120, filed on Apr. 2, 2021, and International Application No.: PCT/US2022/023031, filed on Apr. 1, 2022, which are incorporated by reference herein in their entirety.

FIELD

The present disclosure relates in general to rotor blades, and more particularly to systems and methods for manufacturing rotor blades using thermoplastic materials.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween).

The spar caps are typically constructed of various materials, including but not limited to glass fiber laminate composites and/or carbon fiber laminate composites. The shell of the rotor blade is generally built around the spar caps of the blade by stacking layers of fiber fabrics in a shell mold. The layers are then typically infused together with a resin.

As rotor blades continue to increase in size, conventional infusion processes experience challenges for larger blade production (e.g., rotor blades exceeding 90 meters). Such challenges may include, for example, infusion quality issues and lengthy repair time.

As such, the art is continuously seeking new and improved methods for manufacturing rotor blades and components thereof. Accordingly, the present disclosure is directed to non-infusion-based systems and methods for manufacturing rotor blades using thermoplastic materials that address the aforementioned limitations.

BRIEF DESCRIPTION

Aspects and advantages of the invention will be set forth in part in the following description, or may be obvious from the description, or may be learned through practice of the invention.

In one aspect, the present disclosure is directed to a method for manufacturing an article. The method includes providing a plurality of flat sheets of fiber-reinforced polymer material. The method also includes forming the plurality of flat sheets of the fiber-reinforced polymer material into a plurality of curved sheets of the fiber-reinforced polymer material. Further, the method includes assembling the plurality of curved sheets of the fiber-reinforced polymer material in a tooling device to form an outer shape of the article. Moreover, the method includes securing each of the plurality of curved sheets of the fiber-reinforced polymer material together to form the article.

In an embodiment, the method may include manufacturing the plurality of flat sheets of fiber-reinforced polymer material using a double-belt press, infusion, continuous impregnation, continuous lamination, vacuum molding, or static pressing. In another embodiment, the plurality of flat sheets of fiber-reinforced polymer material may be constructed of a plurality of layers of laminates.

In further embodiments, the method may include cutting the plurality of flat sheets of fiber-reinforced polymer material to a predetermined size. In additional embodiments, the method may include utilizing waste material from the cutting of the plurality of flat sheets of fiber-reinforced polymer material to form one or more reinforcements for the article.

In an embodiment, the method may include forming the plurality of flat sheets of the fiber-reinforced polymer material into the plurality of curved sheets of the fiber-reinforced polymer material using at least one of a thermoforming process, rolling, or curve forming.

In yet another embodiment, the method may include adding one or more layers and/or one or more reinforcements to the plurality of flat sheets of the fiber-reinforced polymer material before forming the plurality of flat sheets of the fiber-reinforced polymer material into the plurality of curved sheets of the fiber-reinforced polymer material. In such embodiments, the reinforcements(s) may include, for example, ribs, stringers, sub frames, core material, or combinations thereof.

In several embodiments, the method may include utilizing automated tape laying, automated fiber placement, a pick and place method, or combinations thereof for adding at least the one or more layers and/or the one or more reinforcements to the plurality of flat sheets of the fiber-reinforced polymer material.

In particular embodiments, adding the one or more layers and/or the one or more reinforcements to the plurality of flat sheets of the fiber-reinforced polymer material may include inline infusion, use of offline manufactured b-staged pre-impregnated fiber material, use of offline manufactured fully-cured pre-impregnated fiber material, use of dry fiber material infused at a later stage, or combinations thereof.

In additional embodiments, the method may include adding the one or more layers and/or the one or more reinforcements to the plurality of curved sheets of the fiber-reinforced polymer material. In an embodiment, for example, the method may include utilizing at least one of automated tape laying, automated fiber placement, a pick and place method, or combinations thereof for adding at least one of one or more layers and one or more reinforcements to the plurality of curved sheets of the fiber-reinforced polymer material.

In further embodiments, adding the one or more layers and/or the one or more reinforcements to the plurality of curved sheets of the fiber-reinforced polymer material may include inline infusion, use of offline manufactured b-staged pre-impregnated fiber material, use of offline manufactured fully-cured pre-impregnated fiber material, use of dry fiber material infused at a later stage, or combinations thereof.

In an embodiment, the tooling device may be, for example, a mold assembly or jig defining the outer shape of the article. In further embodiments, the tooling device may include one or more securement aids for securing the plurality of curved sheets of the fiber-reinforced polymer material in place.

In yet another embodiment, the tooling device is configured to secure the plurality of curved sheets of the fiber-reinforced polymer material such that adjacent ends of the plurality of curved sheets of the fiber-reinforced polymer material overlap each other. Thus, in such embodiments, the overlapping adjacent ends of the plurality of curved sheets of the fiber-reinforced polymer material may include at least one of fasteners, rivets, interlocking features, spot welding, structural adhesives, or combinations thereof.

In additional embodiments, securing each of the plurality of curved sheets of the fiber-reinforced polymer material together to form the article may include bonding the plurality of curved sheets of the fiber-reinforced polymer material together, welding the plurality of curved sheets of the fiber-reinforced polymer material together, and/or mechanically securing the plurality of curved sheets of the fiber-reinforced polymer material together via one or more fasteners or a tape laying process.

In further embodiments, the plurality of flat sheets of fiber-reinforced polymer material may have different thicknesses and orientations of composite material.

In another embodiment, the fiber-reinforced polymer material may include any suitable resin material, such as a thermoplastic resin, a thermoset rein that becomes a thermoplastic material after curing, or combinations thereof. Moreover, in an embodiment, the fiber-reinforced polymer material may contain predominantly unidirectional fibers. In further embodiments, the fiber-reinforced polymer material may include woven or non-woven multi-axial fibers. Further, in an embodiment, the fiber-reinforced polymer material may include any of glass fibers, carbon fibers, polymer fibers, wood fibers, bamboo fibers, ceramic fibers, nanofibers, metal fibers, or combinations thereof.

In certain embodiments, the article may be a component of a wind turbine, an aircraft, or a watercraft. For example, in an embodiment, the component may be a rotor blade shell or panel, a shear web, a spar cap, or a nacelle of the wind turbine. In particular embodiments, for example, the component may be the rotor blade shell and at least a portion of the shear web. In such embodiments, the method may further include positioning the shear web in the tooling device along with assembling the plurality of curved sheets of the fiber-reinforced polymer material. Further, the shear web may have a flexible, Y-shaped configuration. More specifically, the Y-shaped configuration of the shear web may have legs with inward-extending feet. Thus, in an embodiment, the method may include providing an adhesive on the inward-extending feet such that, when the tooling device is closed, the legs flex outward to reduce a gap tolerance between the inward-extending feet and the rotor blade shell, wherein, upon curing, the adhesive secures the shear web in place.

In another aspect, the present disclosure is directed to another method for manufacturing an article. The method includes providing a diaphragm forming a partition. The method further includes placing a plurality of flat sheets within the diaphragm. The method further includes forming the plurality of flat sheets together into the article. The step of forming the plurality of flat sheets into the article includes the step of infusing the plurality of flat sheets with a matrix. The step of forming the plurality of flat sheets into the article further includes the step of forming the plurality of flat sheets in a tooling device to form an outer shape of the article. The step of forming the plurality of flat sheets into the article includes the step of securing each of the plurality of flat sheets together to form the article.

In yet another aspect, the present disclosure is directed to yet another method for manufacturing an article. The method includes providing a diaphragm forming a partition, the diaphragm having a first end and a second end. The method further includes placing a plurality of flat sheets within the diaphragm. The method further includes forming a vacuum within the diaphragm. The method further includes infusing the plurality of flat sheets with a matrix. The method further includes transferring the diaphragm onto a tooling device while maintaining the vacuum within the diaphragm, the tooling device having a perimeter. The method further includes affixing the first end of the diaphragm onto one side of the perimeter of the tooling device and affixing the second end of the diaphragm onto an opposing side of the perimeter of the tooling device. The method further includes operating the tooling device such that the first end and the second end of the diaphragm are stretched to a desired outer shape of the article. The method further includes creating a pressure differential within the diaphragm. The method further includes securing each of the plurality of flat sheets together to form the article. The method further includes removing the diaphragm.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 8 illustrates a flow diagram of one embodiment of a method of forming an article according to the present disclosure:

FIG. 27(A)-(D) illustrates a view of the tooling device of FIG. 26 forming the diaphragm and the plurality of flat sheets of FIG. 24 according to the present disclosure:

FIG. 28 illustrates a flow diagram of another embodiment of a method of forming an article according to the present disclosure.

DETAILED DESCRIPTION

Figure 1:
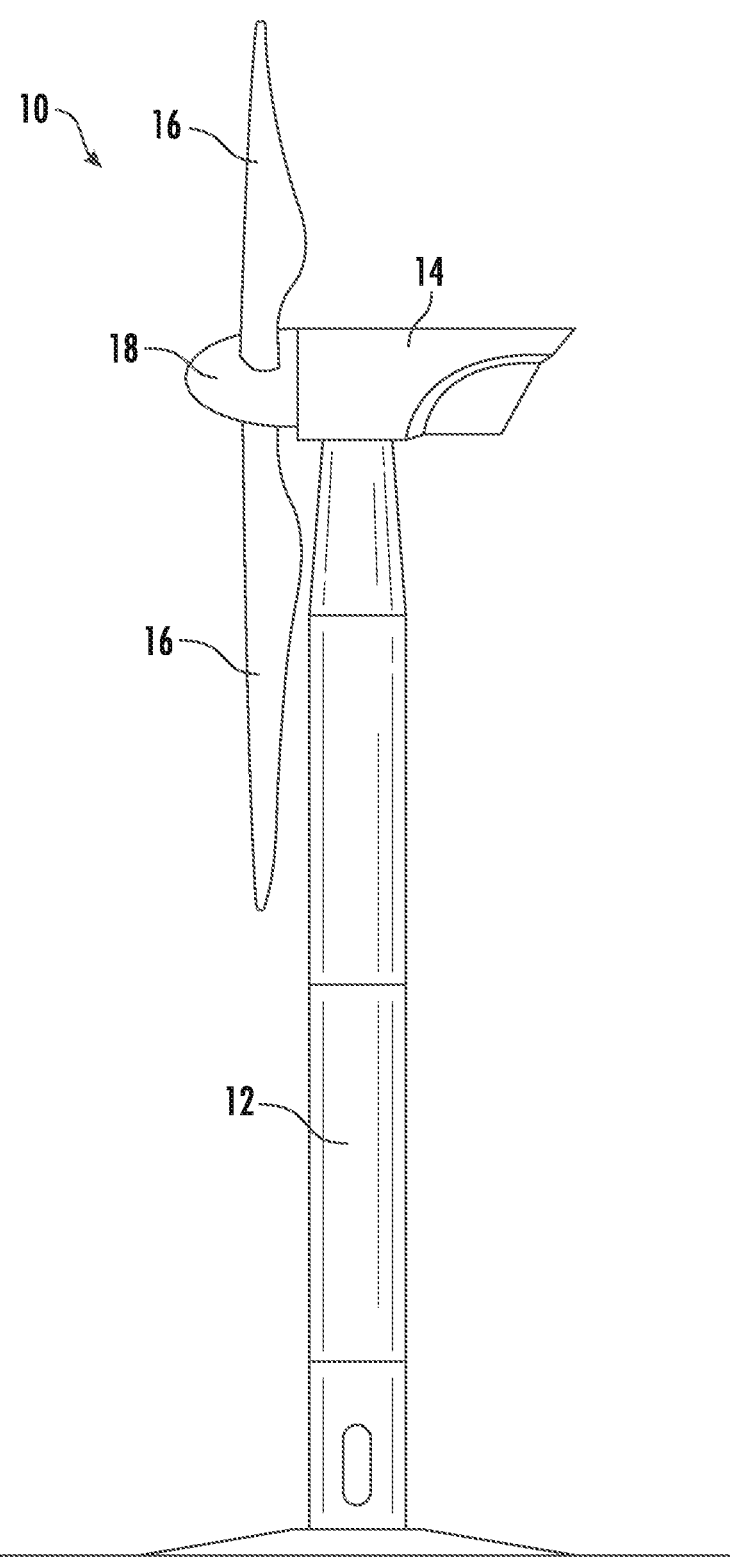
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a method of manufacturing articles, such as wind turbine rotor blades, using thermoplastic materials. For example, in an embodiment, the rotor blade can be constructed of a number of flat fiber reinforced pre-fabricated sheets which are then further processed according to their location and function in the rotor blade. In particular embodiments, such the flat sheets can be particularly useful in forming the outer shells and the shear web of the rotor blade. However, it should be understood that the components described herein may also be used in a number of applications, such as rotor blades, yachts and/or aircraft. More specifically, the components described herein may be constructed by performing an assembly of a number of individual parts. Furthermore, the components can be made with composite materials containing a combination of reinforcing fibers and thermoplastic resin. In particular, a component may include a plurality of standard laminates that are produced as flat sheets. These flat laminates are then formed to their required shape using a tooling device. On a standard laminate, additional layers and reinforcements may also be added as needed. These additional items can be added while the laminate is still flat, or after forming to final shape. The laminates can then be formed to obtain a desired 3-D or curved shape, e.g., as required for the curved outer shape of the rotor blade. Such forming, for example, can be performed using various tools that have the required shape. In order to reduce the amount of tooling needed, an adaptable tool(s) may be used. Multiple formed laminates are then assembled to obtain the final component. This assembly can be performed by mechanical joining or by bonding (potentially also including fiber material) or a combination thereof.

Thus, the methods described herein provide many advantages not present in the prior art. For example, in an embodiment, the methods described herein provide for blade design optimized without experiencing the same constraints as conventional infusion processes. The final component has a lower mass, lower cost, higher quality, shorter repair time, improved supply chain and cost, and improved repair time. Moreover, the methods of the present disclosure utilize low temperature thermoplastic recyclable materials, which improves recyclability/sustainability, waste reduction/reuse, environmental health and safety, and materials performance/design safety due to increased toughness. In addition, by using reactive/UV-cured low temperature thermoplastic resins, the methods of the present disclosure have improved joinability between blade sections. The use of thermoplastics also opens up the option to supplement the joint with welding technologies. Further, the methods of the present disclosure provide a more assembled lean and automotive assembly factory, which is characterized by a number of smaller reusable molds, a number of smaller, more accurately controlled conversion steps, and a number of smaller, lower mass movements. As such, the present disclosure does not require cranes or large buildings and significantly reduces waste and/or emissions, and also increases recyclability. In addition, the methods of the present disclosure also provide improved dimensional accuracy and/or significant improvement on blade product cycle time.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbines, but may be utilized in any application using resin materials. Further, the methods described herein may also apply to manufacturing any similar structure that benefits from the resin formulations described herein.

Figure 2:
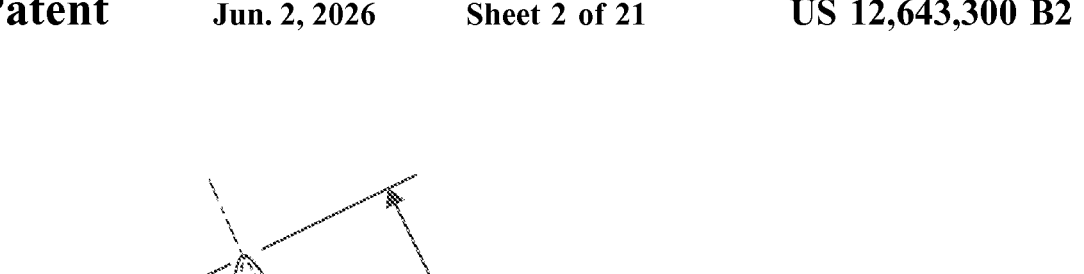
FIG. 2 illustrates a perspective view of one embodiment of a rotor blade of a wind turbine according to the present disclosure.
Figure 3:
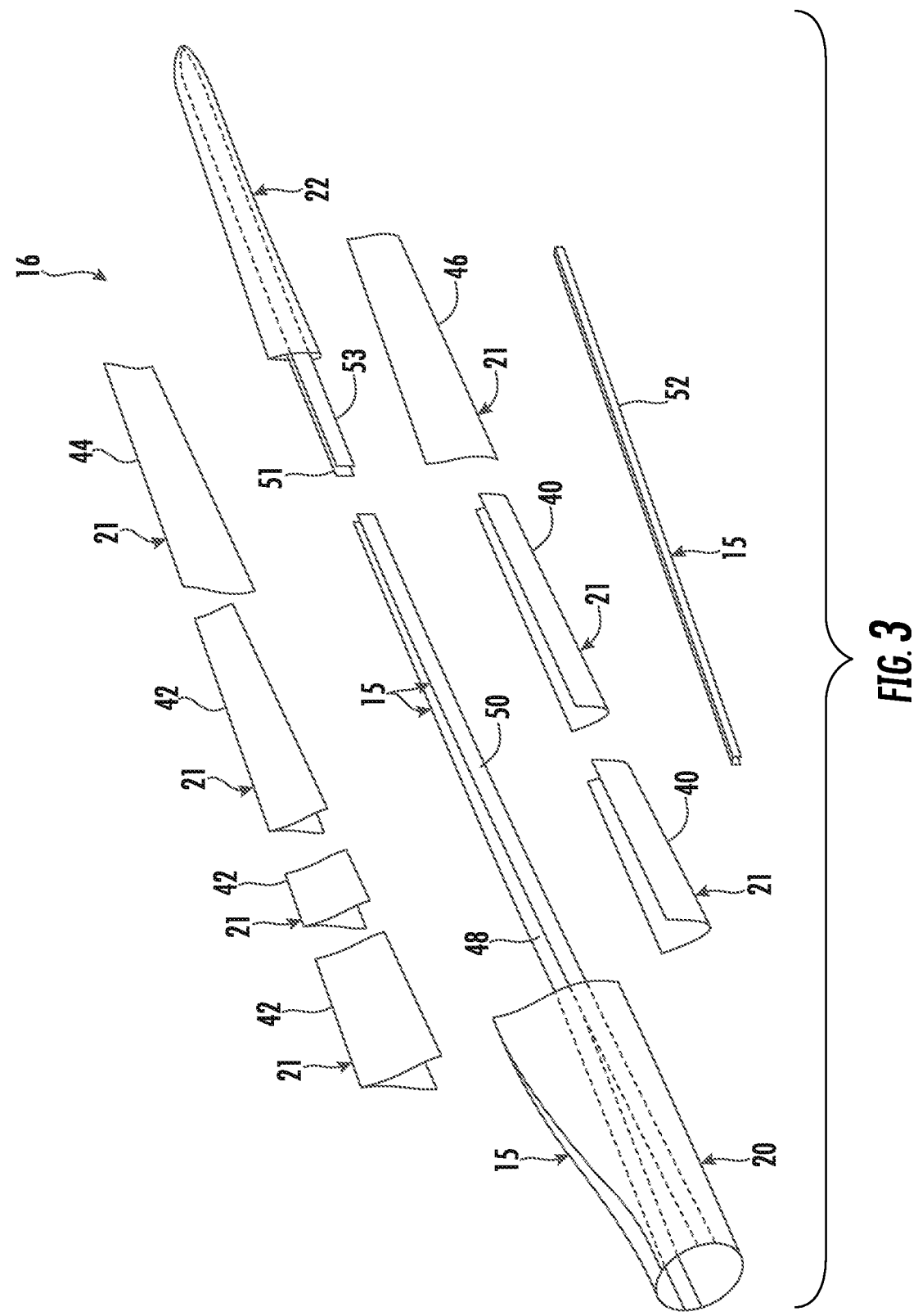
FIG. 3 illustrates an exploded view of the modular rotor blade of FIG. 2.

Referring now to FIGS. 2 and 3, various views of a rotor blade 16 according to the present disclosure are illustrated. As shown, the illustrated rotor blade 16 has a segmented or modular configuration. It should also be understood that the rotor blade 16 may include any other suitable configuration now known or later developed in the art. As shown, the modular rotor blade 16 includes a main blade structure 15 and at least one blade segment 21 secured to the main blade structure 15. More specifically, as shown, the rotor blade 16 includes a plurality of blade segments 21.

Figure 6:
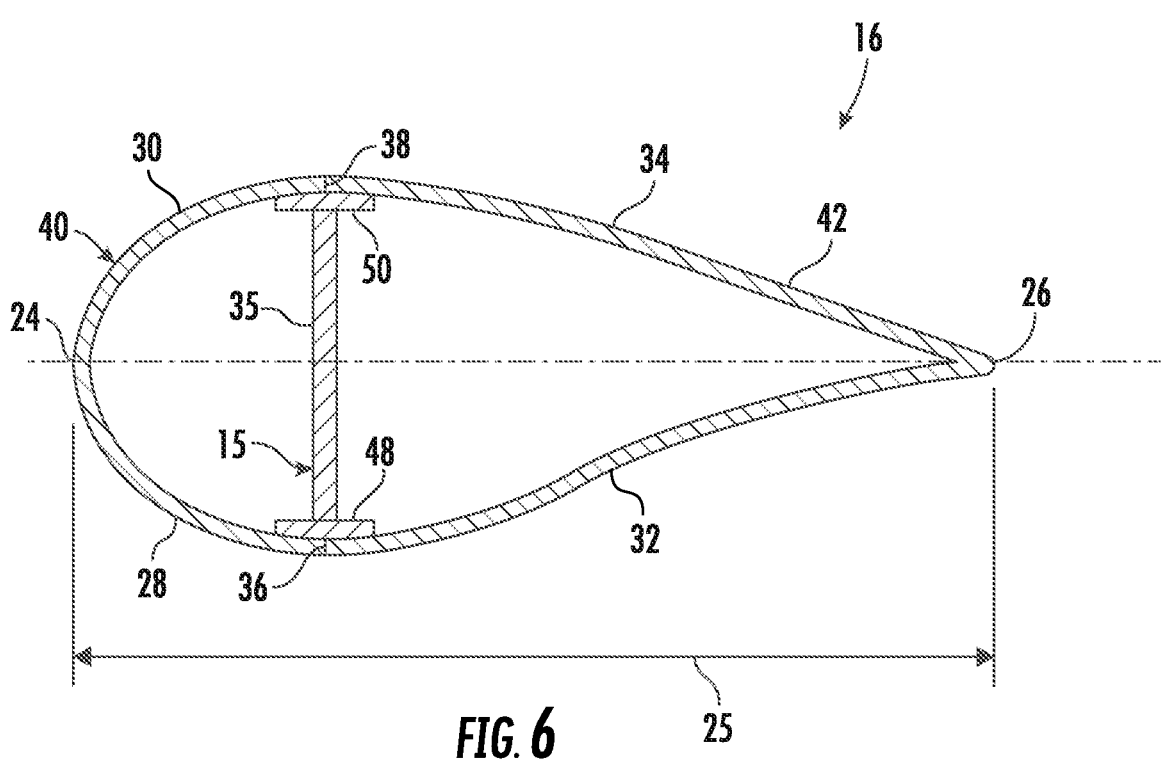
FIG. 6 illustrates a cross-sectional view of the modular rotor blade of FIG. 2 according to the present disclosure.

More specifically, as shown, the main blade structure 15 may include any one of or a combination of the following: a pre-formed blade root section 20, a pre-formed blade tip section 22, one or more one or more continuous spar caps 48, 50, 51, 53, one or more shear webs 35 (FIGS. 6-7), an additional structural component 52 secured to the blade root section 20, and/or any other suitable structural component of the rotor blade 16. Further, the blade root section 20 is configured to be mounted or otherwise secured to the rotor 18 (FIG. 1). In addition, as shown in FIG. 2, the rotor blade 16 defines a span 23 that is equal to the total length between the blade root section 20 and the blade tip section 22. As shown in FIGS. 2 and 6, the rotor blade 16 also defines a chord 25 that is equal to the total length between a leading edge 24 of the rotor blade 16 and a trailing edge 26 of the rotor blade 16. As is generally understood, the chord 25 may generally vary in length with respect to the span 23 as the rotor blade 16 extends from the blade root section 20 to the blade tip section 22.

Figure 4:
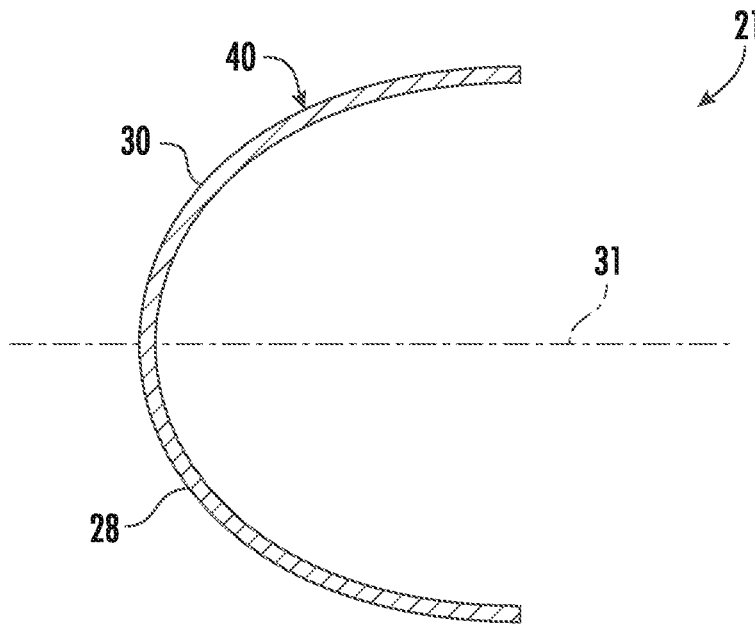
FIG. 4 illustrates a cross-sectional view of one embodiment of a leading edge segment of a modular rotor blade according to the present disclosure.

Referring particularly to FIGS. 2-4, any number of blade segments 21 or panels (also referred to herein as blade shells) having any suitable size and/or shape may be generally arranged between the blade root section 20 and the blade tip section 22 along a longitudinal axis 27 in a generally span-wise direction. Thus, the blade segments 21 generally serve as the outer casing/covering of the rotor blade 16 and may define a substantially aerodynamic profile, such as by defining a symmetrical or cambered airfoil-shaped cross-section.

In additional embodiments, it should be understood that the blade segment portion of the blade 16 may include any combination of the segments described herein and are not limited to the embodiment as depicted. More specifically, in certain embodiments, the blade segments 21 may include any one of or combination of the following: pressure and/or suction side segments 44, 46, (FIGS. 2 and 3), leading and/or trailing edge segments 40, 42 (FIGS. 2-6), a non-jointed segment, a single-jointed segment, a multi-jointed blade segment, a J-shaped blade segment, or similar.

Figure 5:
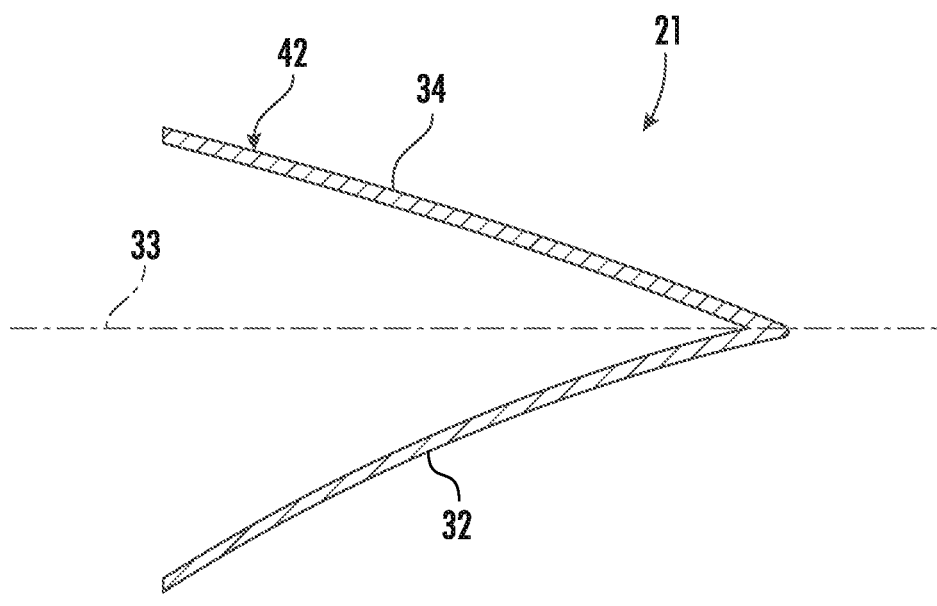
FIG. 5 illustrates a cross-sectional view of one embodiment of a trailing edge segment of a modular rotor blade according to the present disclosure.

More specifically, as shown in FIG. 4, the leading edge segments 40 may have a forward pressure side surface 28 and a forward suction side surface 30. Similarly, as shown in FIG. 5, each of the trailing edge segments 42 may have an aft pressure side surface 32 and an aft suction side surface 34. Thus, the forward pressure side surface 28 of the leading edge segment 40 and the aft pressure side surface 32 of the trailing edge segment 42 generally define a pressure side surface of the rotor blade 16. Similarly, the forward suction side surface 30 of the leading edge segment 40 and the aft suction side surface 34 of the trailing edge segment 42 generally define a suction side surface of the rotor blade 16. In addition, as particularly shown in FIG. 6, the leading edge segment(s) 40 and the trailing edge segment(s) 42 may be joined at a pressure side seam 36 and a suction side seam 38. For example, the blade segments 40, 42 may be configured to overlap at the pressure side seam 36 and/or the suction side seam 38. Further, as shown in FIG. 2, adjacent blade segments 21 may be configured to overlap at a seam 54. Alternatively, in certain embodiments, the various segments of the rotor blade 16 may be secured together via an adhesive (or mechanical fasteners) configured between the overlapping leading and trailing edge segments 40, 42 and/or the overlapping adjacent leading or trailing edge segments 40, 42.

In specific embodiments, as shown in FIGS. 2-3 and 6-7, the blade root section 20 may include one or more longitudinally extending spar caps 48, 50 infused therewith. For example, the blade root section 20 may be configured according to U.S. application Ser. No. 14/753,155 filed Jun. 29, 2015 entitled "Blade Root Section for a Modular Rotor Blade and Method of Manufacturing Same" which is incorporated herein by reference in its entirety.

Similarly, the blade tip section 22 may include one or more longitudinally extending spar caps 51, 53 infused therewith. More specifically, as shown, the spar caps 48, 50, 51, 53 may be configured to be engaged against opposing inner surfaces of the blade segments 21 of the rotor blade 16. Further, the blade root spar caps 48, 50 may be configured to align with the blade tip spar caps 51, 53. Thus, the spar caps 48, 50, 51, 53 may generally be designed to control the bending stresses and/or other loads acting on the rotor blade 16 in a generally span-wise direction (a direction parallel to the span 23 of the rotor blade 16) during operation of a wind turbine 10. In addition, the spar caps 48, 50, 51, 53 may be designed to withstand the span-wise compression occurring during operation of the wind turbine 10. Further, the spar cap(s) 48, 50, 51, 53 may be configured to extend from the blade root section 20 to the blade tip section 22 or a portion thereof. Thus, in certain embodiments, the blade root section 20 and the blade tip section 22 may be joined together via their respective spar caps 48, 50, 51, 53.

Figure 7:
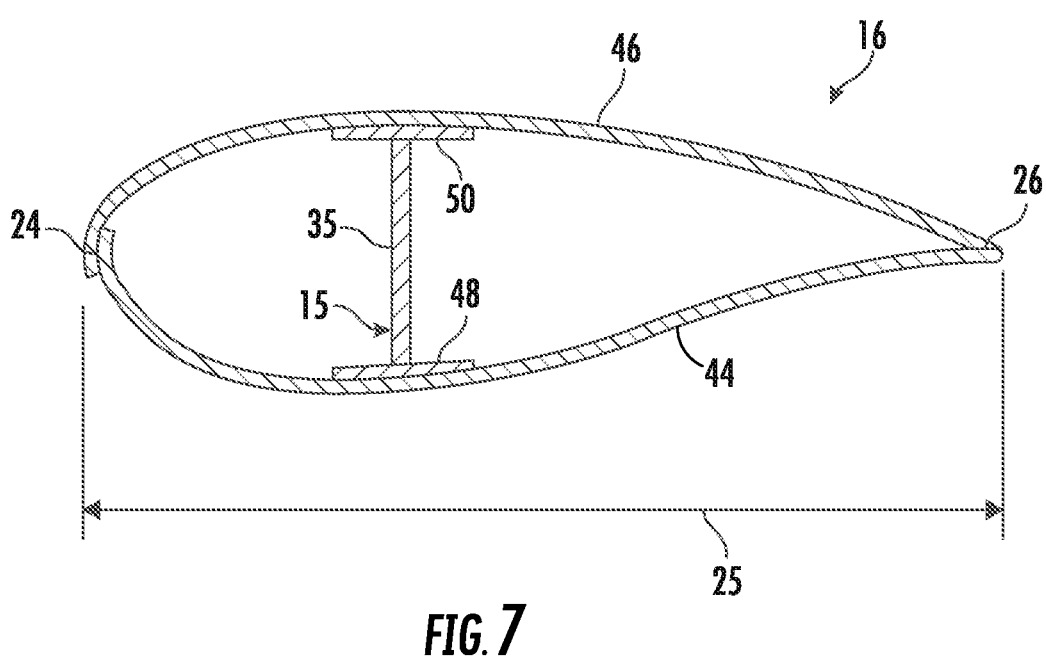
FIG. 7 illustrates a cross-sectional view of the modular rotor blade of FIG. 2 according to the present disclosure.

Referring to FIGS. 6-7, one or more shear webs 35 may be configured between the one or more spar caps 48, 50, 51, 53. More particularly, the shear web(s) 35 may be configured to increase the rigidity in the blade root section 20 and/or the blade tip section 22. Further, the shear web(s) 35 may be configured to close out the blade root section 20.

In addition, as shown in FIGS. 2 and 3, the additional structural component 52 may be secured to the blade root section 20 and extend in a generally span-wise direction so as to provide further support to the rotor blade 16. For example, the structural component 52 may be configured according to U.S. application Ser. No. 14/753,150 filed Jun. 29, 2015 entitled "Structural Component for a Modular Rotor Blade" which is incorporated herein by reference in its entirety. More specifically, the structural component 52 may extend any suitable distance between the blade root section 20 and the blade tip section 22. Thus, the structural component 52 is configured to provide additional structural support for the rotor blade 16 as well as an optional mounting structure for the various blade segments 21 as described herein. For example, in certain embodiments, the structural component 52 may be secured to the blade root section 20 and may extend a predetermined span-wise distance such that the leading and/or trailing edge segments 40, 42 can be mounted thereto.

Referring now to FIG. 8, a flow diagram of one embodiment of a method 100 for forming polymer articles, such as any of the rotor blade components described herein, is illustrated. As such, in certain embodiments, the article may include a rotor blade shell (a pressure side shell, a suction side shell, a trailing edge segment, a leading edge segment, etc.), a spar cap, a shear web, a blade tip, a blade root, or any other rotor blade component. In general, the method 100 is described herein as implemented for manufacturing the rotor blade components described above. However, it should be appreciated that the disclosed method 100 may be used to manufacture any other rotor blade components as well as any other articles, such as watercraft, aircraft, or similar. In addition, although FIG. 8 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

Figure 9:
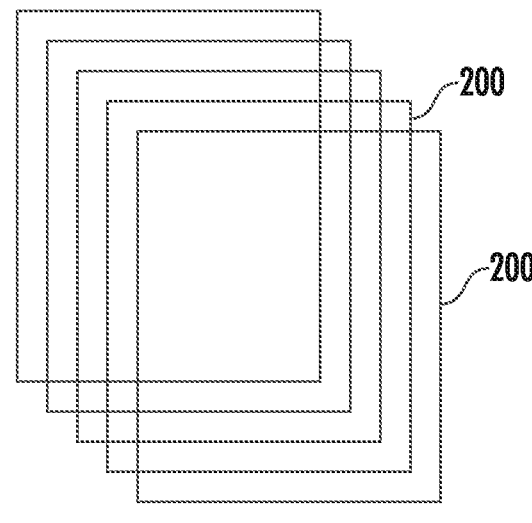
FIG. 9 illustrates a schematic view of one embodiment of a plurality of flat sheets used in manufacturing an article according to the present disclosure.

As shown at (102), the method 100 includes providing a plurality of flat sheets of fiber-reinforced polymer material. For example, in an embodiment, as shown in FIG. 9, one embodiment of the plurality of flat sheets 200 of the fiber-reinforced polymer material is illustrated. In such embodiments, as shown, each of the flat sheets 200 of fiber-reinforced polymer material may be constructed of one or more layers of laminate. In further embodiments, the flat sheets 200 of fiber-reinforced polymer material may have different thicknesses and orientations of composite material.

Figure 11:
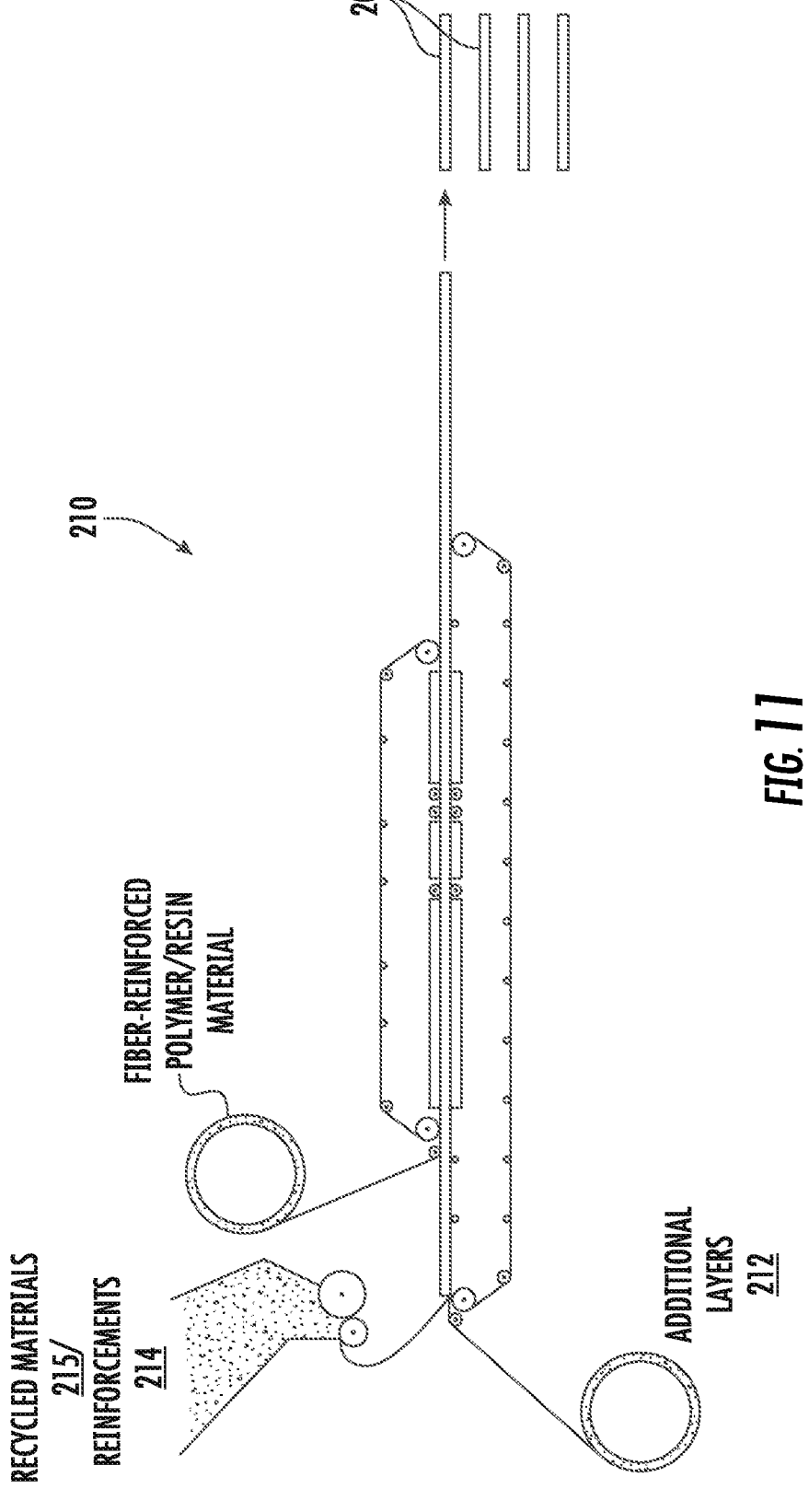
FIG. 11 illustrates a schematic view of one embodiment of a double belt press for forming a flat sheet used in manufacturing an article according to the present disclosure.

In further embodiments, the method 100 may also include manufacturing the plurality of flat sheets 200 of fiber-reinforced polymer material using a continuous process, such as via a double-belt press, infusion, continuous impregnation (e.g., pre-pregging), continuous lamination, vacuum molding, or static pressing. For example, FIG. 11 illustrates one embodiment of a double belt press 210 according to the present disclosure that uses a defined combination of fiber material(s), resin material(s), and/or recycled materials. In certain embodiments, there may be multiple types of standard laminates based on the amount and/or combination of fiber material.

Moreover, as shown, in one embodiment, the method 100 may include cutting/trimming the flat sheets 200 of fiber-reinforced polymer material to a predetermined size, e.g., suitable for initial handling, storage, shipping. For example, as shown in FIG. 11, the formed continuous sheet from the double-belt press 210 may be cut into the flat sheets 200. In additional embodiments, other methods may be used to form the flat sheets 200 as well, such as infusion, vacuum molding, continuous impregnation, continuous lamination, static pressing, or any other suitable method, including all impregnation forms for thermoplastic and thermoset materials. Moreover, in an embodiment, as shown, the method 100 may include utilizing waste material from the cutting of the plurality of flat sheets 200 of fiber-reinforced polymer material to form one or more reinforcements for the rotor blade 16, e.g., as indicated in FIG. 11.

Figure 12:
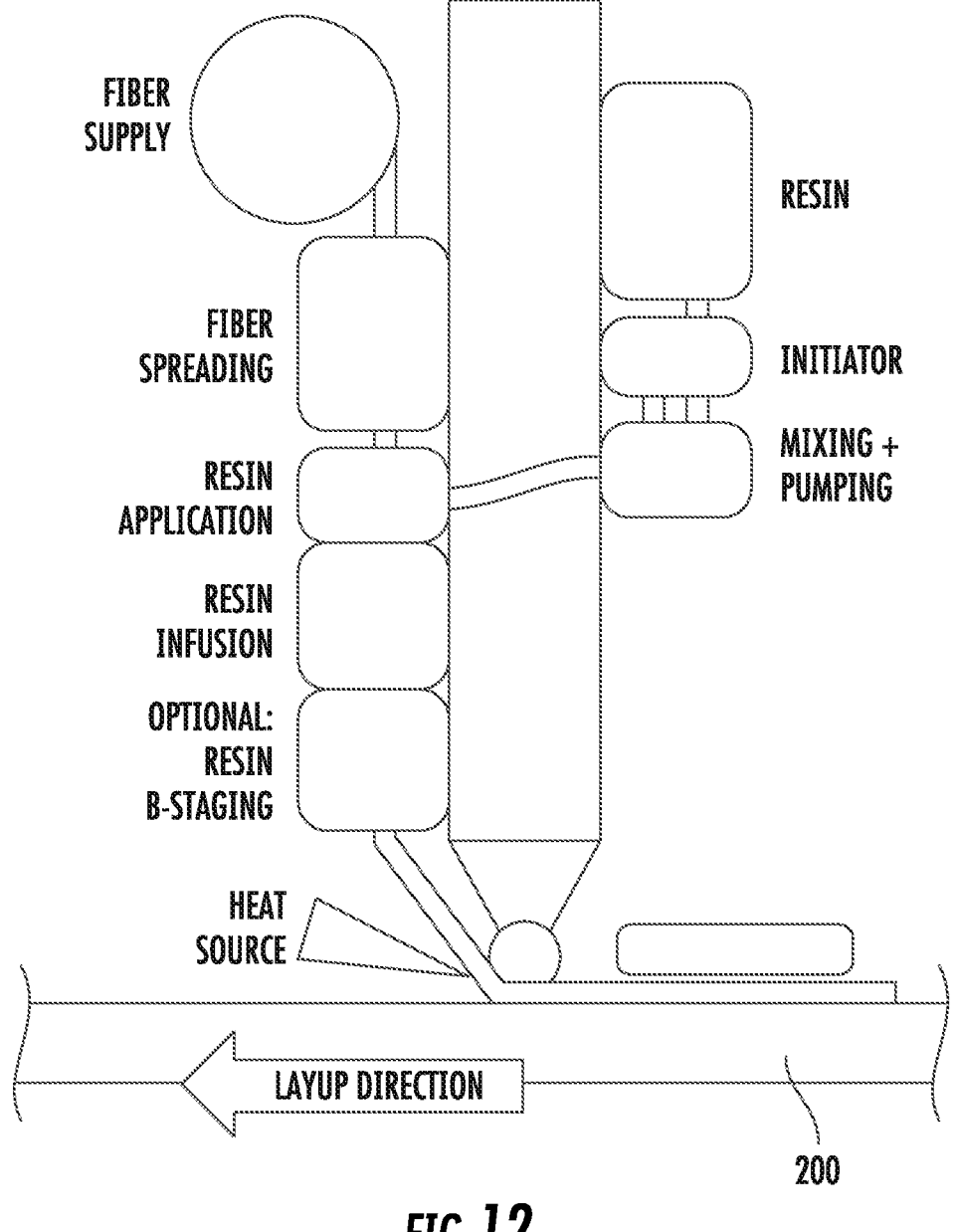
FIG. 12 illustrates a schematic diagram of one embodiment of an inline infusion process according to the present disclosure.
Figure 13:
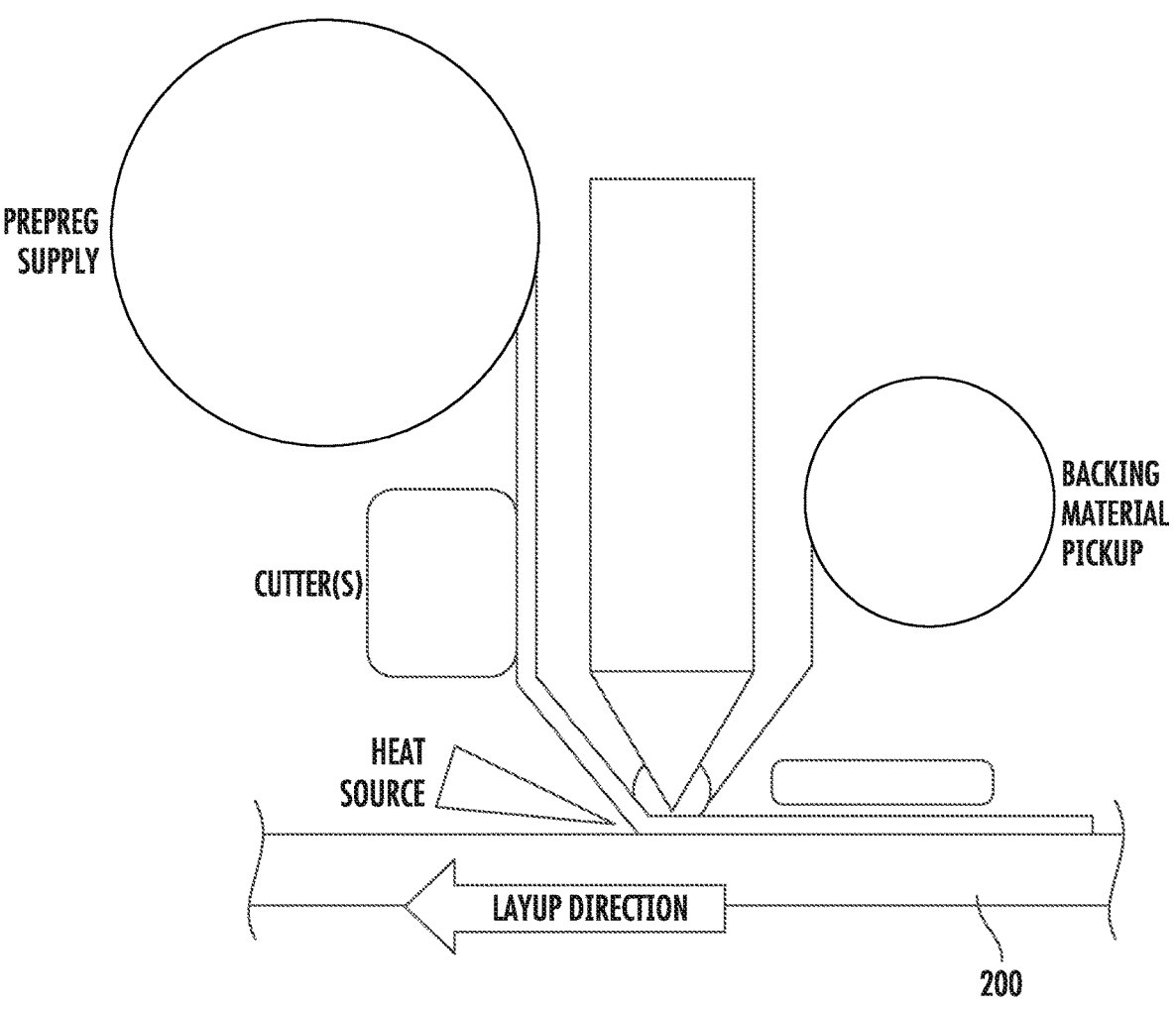
FIG. 13 illustrates a schematic diagram of one embodiment of an offline infusion b-staged process according to the present disclosure.
Figure 14:
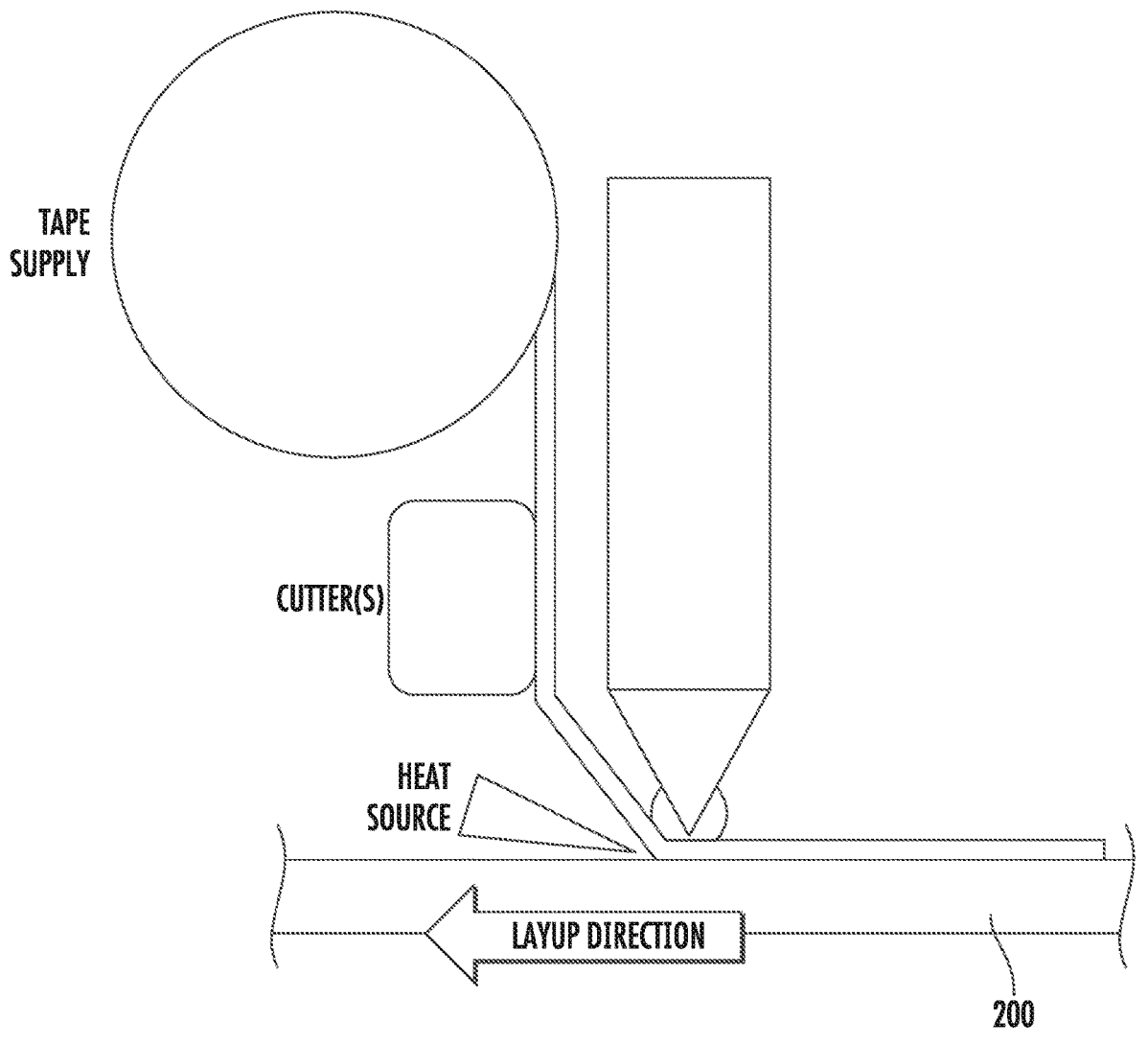
FIG. 14 illustrates a schematic diagram of one embodiment of an offline infusion cured process according to the present disclosure.

In particular embodiments, the method 100 may include adding one or more layers 212 and/or one or more reinforcements 214 to the flat sheets 200, e.g., before forming the flat sheets 200 into the curved sheets 202 (or before cutting the flat sheets 200), using any suitable method. In such embodiments, the reinforcements(s) 214 may include, for example, ribs, stringers, sub frames, core material, or combinations thereof. In several embodiments, the layer(s) 212 and/or the reinforcement(s) 214 may be added to the flat sheets 200 utilizing, for example, manual layup and forming, automated tape laying, automated fiber placement, a pick and place method, or combinations thereof. Furthermore, in particular embodiments, the layer(s) 212 and/or the reinforcement(s) 214 may be added to the flat sheets 200 using inline infusion (e.g., FIG. 12), offline manufactured b-staged pre-impregnated fiber material (e.g., FIG. 13), offline manufactured fully-cured pre-impregnated fiber material (e.g., FIG. 14), dry fiber material infused at a later stage, or combinations thereof.

The fiber-reinforced polymer material described herein may include any suitable resin material, such as a thermoplastic resin, a thermoset rein that becomes a thermoplastic material after curing, or combinations thereof. The thermoset materials as described herein generally encompass a plastic material or polymer that is non-reversible in nature. For example, thermoset materials, once cured, cannot be easily remolded, or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

The thermoplastic materials as described herein generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. Exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include poly(butylene terephthalate) (PBT), poly(ethylene terephthalate) (PET), polytrimethylene terephthalate (PTT), polypropylene, poly(phenyl sulfide), polyethylene, polyamide (nylon), polyetherketone, or any other suitable semi-crystalline thermoplastic material.

Amorphous thermoplastic materials as described herein generally encompass a plastic material or polymer that is reversible in nature. For example, amorphous thermoplastic materials typically become pliable or moldable when heated to a certain temperature and returns to a more rigid state upon cooling. Some example amorphous thermoplastic materials may generally include, but are not limited to, styrenes, vinyls, cellulosics, polyesters, acrylics, polysulfones, and/or imides. More specifically, exemplary amorphous thermoplastic materials may include polystyrene, acrylonitrile butadiene styrene (ABS), poly(methyl methacrylate) (PMMA), PETG, polycarbonate, poly(vinyl acetate), amorphous polyamide, poly(vinyl chloride) (PVC), poly(vinylidene chloride), polyurethane, or any other suitable amorphous thermoplastic material. Such infusible thermoplastics can also be cast, compounded, extruded, or pultruded and may include reinforcing fibers to create pellets suitable for molding or 3-D printing processes or used in blended combination with any other suitable thermoplastic.

In addition, certain thermoplastic resins provided herein, such as PMMA and polyamides, for example, can be impregnated into structural fabrics via infusion via VARTM or other suitable infusion methods known in the art. One example of an infusible PMMA based resin system may be Elium® from Arkema Corporation. In such embodiments, infusible thermoplastics can be infused into fabrics/fiber materials as a low viscosity mixture of resin(s) and catalyst.

In addition, the fiber-reinforced polymer materials described herein are generally reinforced with one or more fiber materials, including but not limited to glass fibers, carbon fibers, polymer fibers, wood fibers, bamboo fibers, ceramic fibers, nanofibers, metal fibers, or similar or combinations thereof. In addition, the direction of the fibers may include multi-axial, unidirectional, biaxial, triaxial, or any other another suitable direction and/or combinations thereof. In particular embodiments, for example, the fiber-reinforced polymer material may contain predominantly unidirectional fibers. In further embodiments, the fiber-reinforced polymer material may include woven or non-woven multi-axial fibers. Further, in an embodiment, the fiber content may vary depending on the stiffness required in the corresponding blade component, the region or location of the blade component in the rotor blade 16, and/or the desired weldability of the component. In further embodiments, the fiber materials may include relatively long fibers, such as greater than about 10 millimeters (mm), more preferably about 15 mm, and still more preferably about 20 mm.

Figure 10:
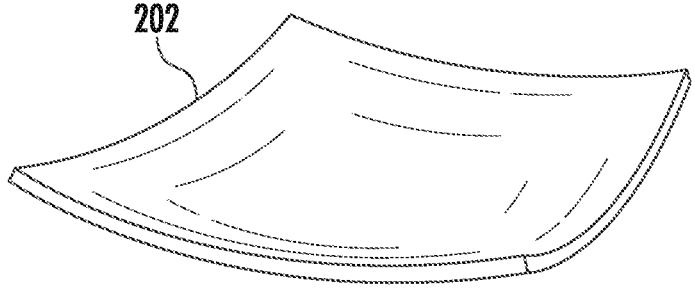
FIG. 10 illustrates a perspective view of one embodiment of a curved sheet used in manufacturing an article according to the present disclosure.

Referring back to FIG. 8, as shown at (104), the method 100 includes forming the plurality of flat sheets 200 of the fiber-reinforced polymer material into a plurality of curved sheets 202 of the fiber-reinforced polymer material. For example, in an embodiment, the method 100 may include forming the flat sheets 200 into the curved sheets using at least one of a thermoforming process, rolling, or curve forming. As shown in FIG. 10, one of the curved sheets 202 of the fiber-reinforced polymer material is illustrated. For example, in an embodiment, one of the flat sheets 200 may be placed on a flat mold and held in place with vacuum or other suitable method. The flat sheet 200 may then be heated and the thermoforming tool adjusted to the required shape, at the same time forming the sheet.

The sheets 200 may then have additional structure applied thereto as needed. For example, in an embodiments, the method 100 may include adding the layer(s) 212 and/or the reinforcement(s) 214 to the curved sheets 202 (rather than the flat sheets). In certain embodiments, for example, the method 100 may include utilizing at least one of automated tape laying, automated fiber placement, a pick and place method, or combinations thereof for adding the layer(s) 212 and/or the reinforcement(s) 214 to the curved sheets 202. In further embodiments, adding the layer(s) 212 and/or the reinforcement(s) 214 to the curved sheets 202 may be completed using inline infusion, use of offline manufactured b-staged pre-impregnated fiber material, use of offline manufactured fully-cured pre-impregnated fiber material, use of dry fiber material infused at a later stage, or combinations thereof.

Figures 15, 16:
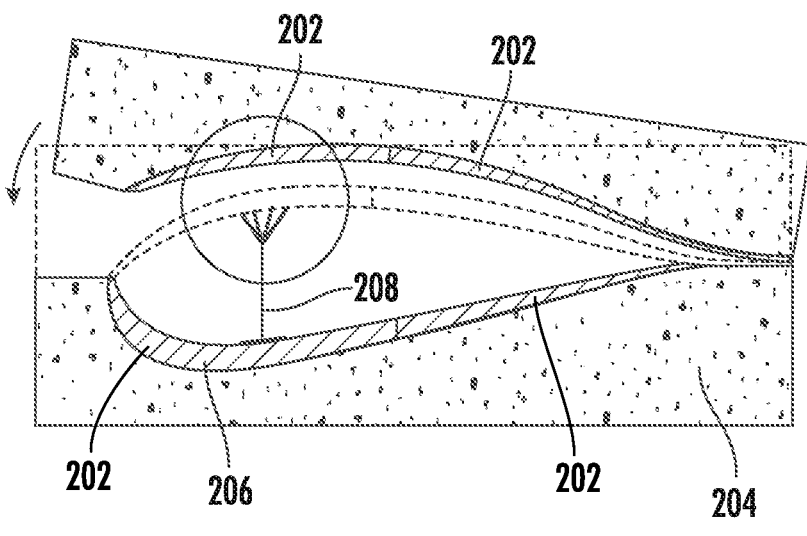
FIG. 15 illustrates a cross-sectional view of one embodiment of a tooling device according to the present disclosure, particularly illustrating a plurality of curved sheets secured therein.
FIG. 16 illustrates a schematic view of one embodiment overlapping ends of adjacent curved sheets within a tooling device according to the present disclosure.

Referring back to FIG. 8, as shown at (106), the method 100 includes assembling the curved sheets 202 of the fiber-reinforced polymer material in a tooling device to form an outer shape of the article. For example, as shown in FIG. 15, a tooling device 204 is illustrated. In the illustrated embodiment, the tooling device 204 is a mold assembly defining the outer shape of the rotor blade 16. In further embodiments, the tooling device 204 may be a jig defining the outer shape of the of the rotor blade 16. In further embodiments, as shown, the tooling device 204 may include one or more securement aids 206 for securing the plurality of curved sheets 202 of the fiber-reinforced polymer material in place. In additional embodiments, the tooling device 204 may be adaptable such that various component shapes can be manufactured.

In yet another embodiment, as shown in FIGS. 15 and 16, the tooling device 204 is configured to secure the curved sheets 202 in place such that adjacent ends 208 of the curved sheets 202 overlap each other. Thus, in such embodiments, as shown, the overlapping adjacent ends 208 of the curved sheets 202 of the fiber-reinforced polymer material may include at least one of fasteners, rivets, interlocking features, spot welding, structural adhesives, or combinations thereof.

Thus, once the curved sheets 202 are assembled in the tooling device 204, the sheets 202 can be permanently secured together. More specifically, referring back to FIG. 8, as shown at (108), the method 100 includes securing each of the plurality of curved sheets 202 of the fiber-reinforced polymer material together to form the rotor blade 16. For example, in certain embodiments, securing each of the curved sheets 202 together to form the rotor blade 16 may include bonding the curved sheets 202 together, welding the curved sheets 202 together, in situ layup of material in the overlapping areas, and/or mechanically securing the curved sheets 202 together via one or more fasteners or a tape laying process.

Figure 17:
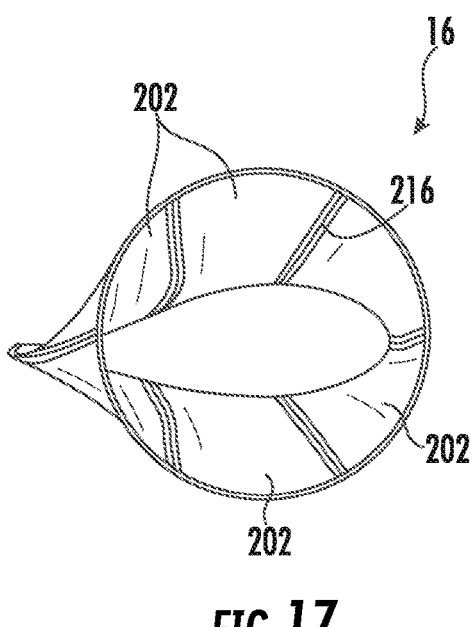
FIG. 17 illustrates a perspective view of one embodiment of a rotor blade formed of a plurality of curved sheets according to the present disclosure, particularly viewing the rotor blade from the root to the tip.
Figure 18:
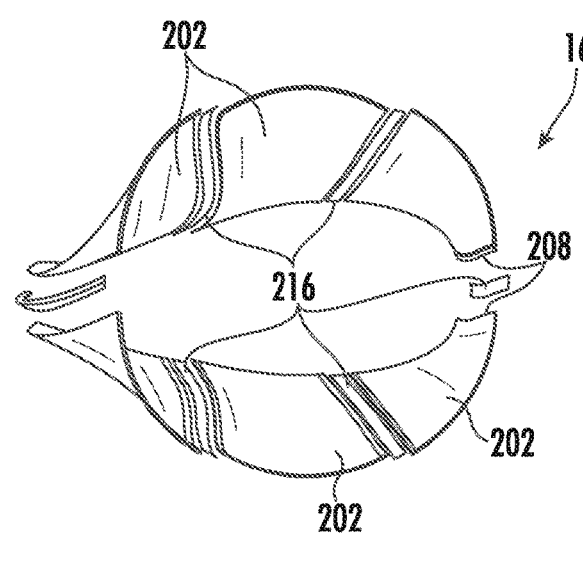
FIG. 18 illustrates an exploded view of the rotor blade of FIG. 17.
Figure 19:
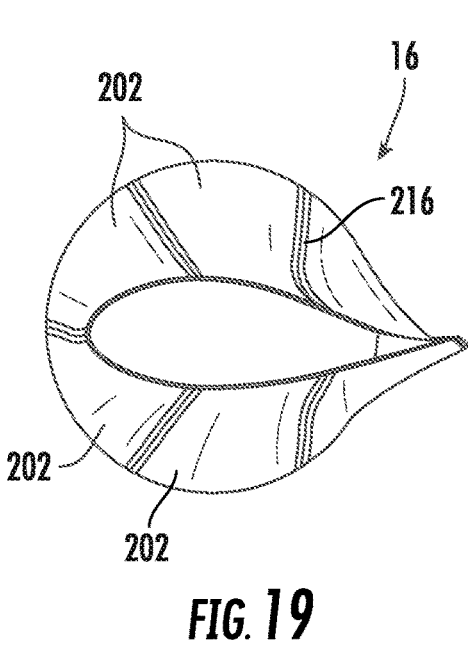
FIG. 19 illustrates a perspective view of one embodiment of a rotor blade formed of a plurality of curved sheets according to the present disclosure, particularly viewing the rotor blade from tip to the root.
Figure 20:
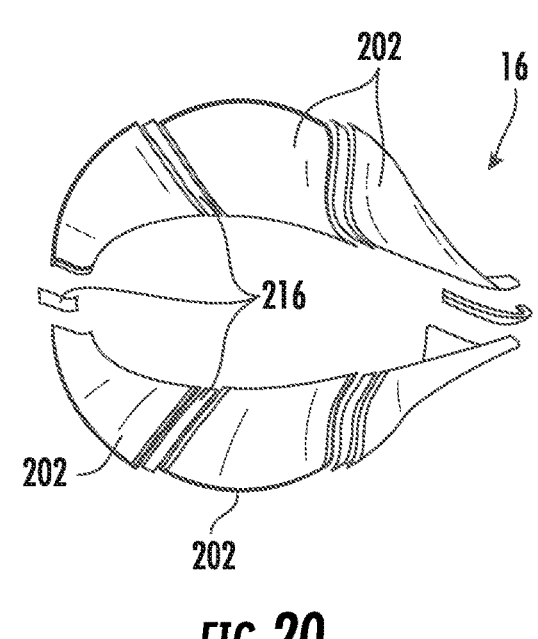
FIG. 20 illustrates an exploded view of the rotor blade of FIG. 19.
Figures 21, 22:
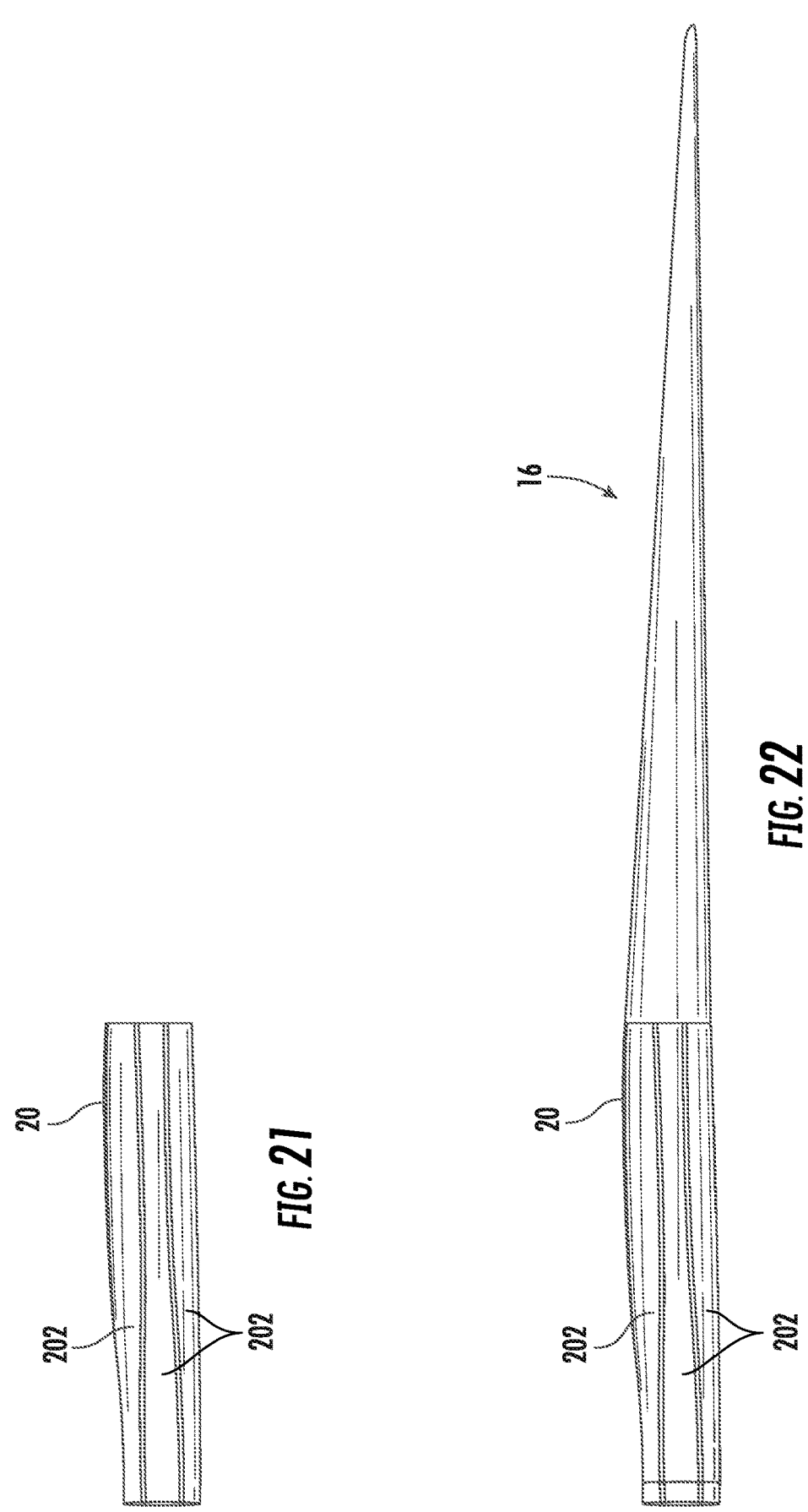
FIG. 21 illustrates a perspective view of one embodiment of a root section of a rotor blade formed of a plurality of curved sheets according to the present disclosure.
FIG. 22 illustrates a perspective view of one embodiment of a rotor blade formed of a plurality of curved sheets according to the present disclosure.

Referring now to FIGS. 17-20, various views of the rotor blade 16 manufactured according to the present disclosure are illustrated. In particular, FIGS. 17-18 illustrate the rotor blade 16 as viewed from the root to the tip, whereas FIGS. 19 and 20 illustrate the rotor blade 16 as viewed from the tip to the root. Moreover, as shown, FIGS. 17 and 19 illustrate the assembled rotor blade 16, whereas FIGS. 18 and 20 illustrate exploded views of the rotor blade 16. Thus, as shown in the illustrated embodiment, adjacent ends 208 of the curved sheets 202 are secured together via thermoplastic tape 216. Moreover, as shown in FIGS. 21 and 22, the methods and components described herein may be particularly suited for forming the root section 20 of the rotor blade 16.

Figure 23C:
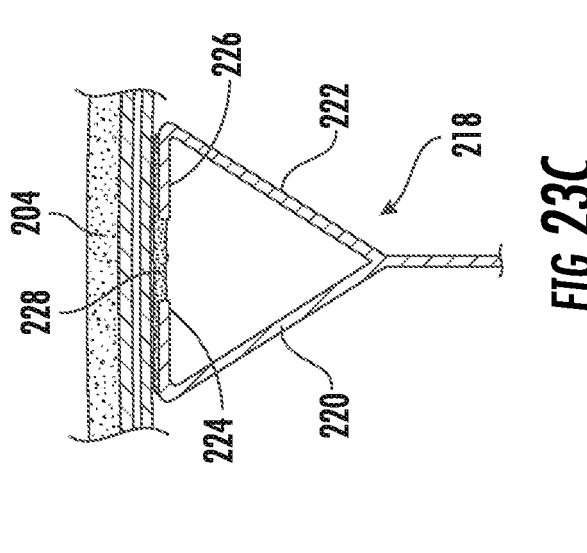
FIGS. 23(A)-(C) illustrates a schematic diagram of one embodiment of the various stages of assembling a flexible shear web into a tooling device according to the present disclosure.
Figure 23B:
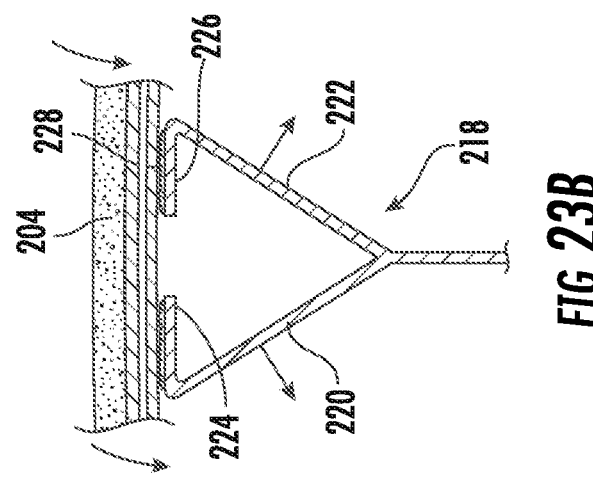
Figure 23A:
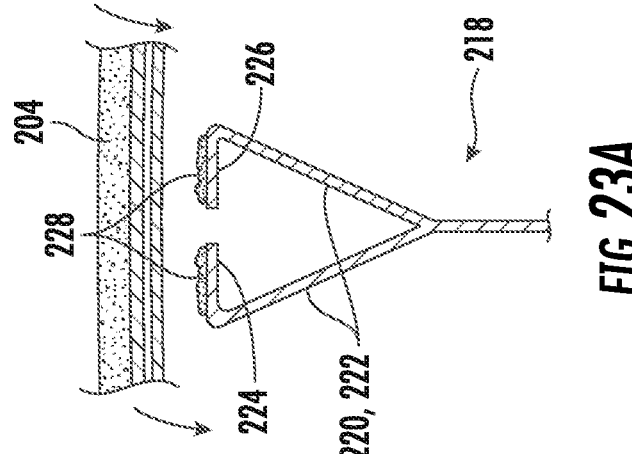

Referring now to FIGS. 15, 23(A), 23(B), and 23(C), in an embodiment, the method 100 described herein may also include positioning the shear web (e.g., such as shear web 35) in the tooling device 204 along with assembling the curved sheets 202 of the fiber-reinforced polymer material. In certain embodiments, however, rather than the conventional shear web shown in FIGS. 6 and 7, the present disclosure is also directed to a shear web 218 having a flexible, Y-shaped configuration. More specifically, as shown, the Y-shaped configuration of the shear web 218 may have flexible/adjustable legs 220, 222 with inward-extending feet 224, 226. Thus, in an embodiment, as shown in FIG. 23(A), the method 100 may include providing an adhesive 228 on the inward-extending feet 224, 226. Accordingly, when the tooling device 204 is closed and/or pressure is applied to the shear web 218 (FIG. 23(B)), the legs 220, 222 flex outward to reduce a gap tolerance 230 between the inward-extending feet 224, 226 and the rotor blade shell. Thus, upon curing, as shown in FIG. 23(C), the adhesive 228 secures the shear web 218 in place and the bond gap is minimized.

In an addition to the aforementioned disclosure discussed above. The present disclosure is also generally directed to another method of manufacturing articles. For example, in an embodiment, the article may be manufactured from a plurality of flat sheets of material, such as a reinforcement material, an uncured material or a pre-cured material, or a thermoplastic material, a thermoset material that becomes a thermoplastic material after curing, or combinations thereof, which are then processed with a variety of means depending on the type of material. The sheets may also be prefabricated or fabricated on-site before being further processed. In particular embodiments, the method can be particularly useful for manufacturing components of wind turbines, such as wind turbine rotor blades. However, the method may also be capable of manufacturing other articles as well, such as aircraft or watercraft components. Components like wind turbine rotor blades may also be formed using multiple subcomponents which may be manufactured according to the methods of the present disclosure. For example, sub-components may be particularly designed using the methods of the present disclosure such that tools are not further required to assemble the subcomponents into a rotor blade. In particular, the method may utilize a diaphragm where the plurality of prefabricated flat sheets of material may be placed therein. The diaphragm may be a double diaphragm or a single diaphragm. Further, the diaphragm may have additional elements incorporated with it such as heating or cooling elements. The flat sheets may then be infused with a matrix, formed in a tooling device, and then secured together to form an article. The tooling device may be an adaptable tooling device, and the process of infusion and forming may occur while the sheets are yet to be formed into an outer shape of the article. Further, the tooling device may have various other devices or elements integrated with it such as a heating, cooling, or curing element or a vacuum element.

Thus, the methods described herein provide many other advantages not present in the prior art. For example, in an embodiment, the methods described herein provide for the reduced need for the number of shaped tools for manufacture of articles or other forms of 3D structures such as 3D shaped laminates. For example, in an embodiment, the methods described herein may provide for the reduced need for the number of shaped tools when an adaptable tool is utilized. Further, the method may allow for multiple aspects of the manufacturing process to occur using a reduced number of tools overall when additional elements are incorporated with a tooling device. The method may also allow for the easier manipulation of the plurality of prefabricated flat sheets of material as they are processed when using a diaphragm. Further, by providing a diaphragm, the method may also allow for more support to be provided to the plurality of flat sheets. Further still, the diaphragm may also provide secondary functionality to the manufacturing process such as acting as a vacuum bag or chamber. The diaphragm acting as a vacuum bag or chamber may be particularly useful when infusion of the plurality of flat sheets or transferring the plurality of flat sheets after the infusion is desired. Furthermore, when additional elements such as heating or cooling elements are incorporated into the diaphragm, the number of tools required for the overall manufacturing process may be reduced further. The method may also allow for the more rapid manufacture of high-quality composite parts or articles with minimal operator experience when the process of infusion occurs before the flat sheets are formed to the outer shape of an article. This rapid manufacturing may particularly be the case when the infusion process occurs in a vacuum.

Figure 24:
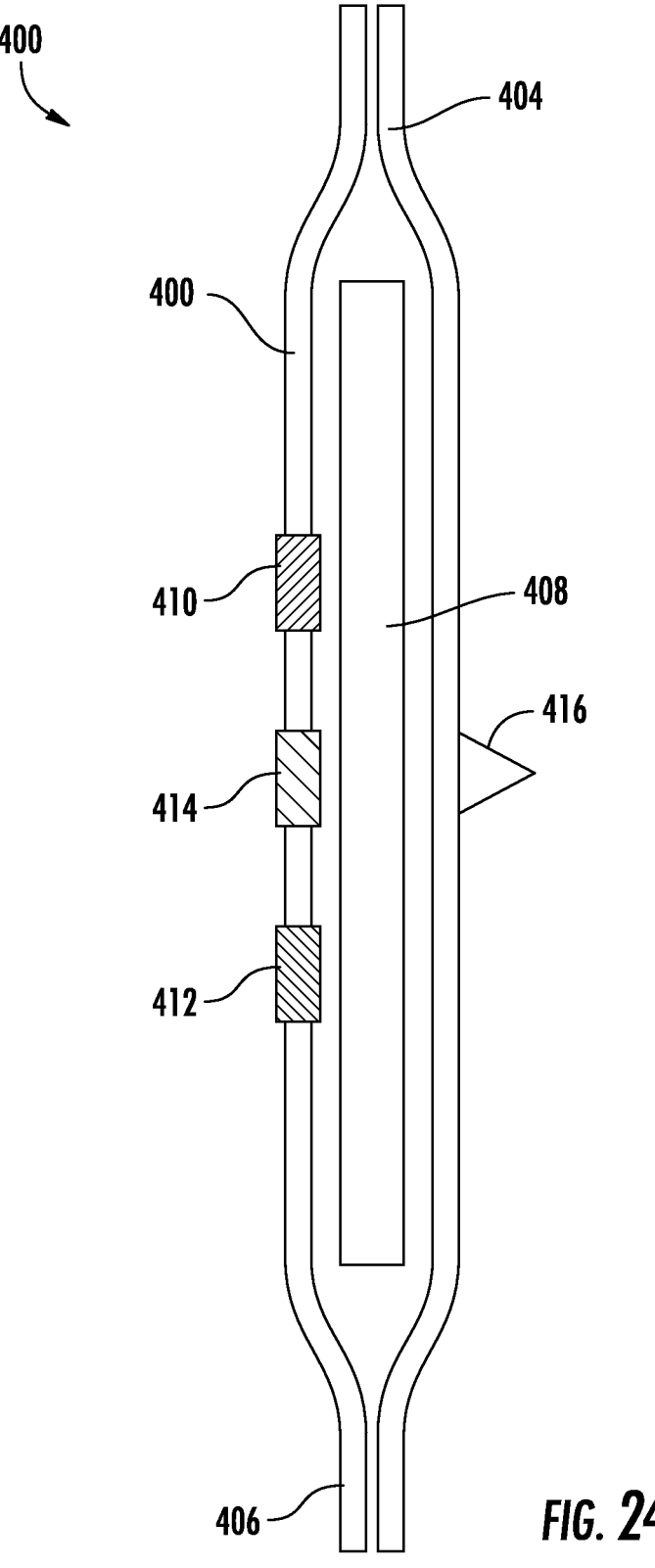
FIG. 24 illustrates an embodiment of a diaphragm with a plurality of flat sheets placed therein according to the present disclosure.

Referring now to FIG. 24, an embodiment of a diaphragm with a plurality of flat sheets placed therein is illustrated. As shown, the diaphragm 400 may include a first end 404 and a second end 406. In addition, the diaphragm 400 may be a single diaphragm or a double diaphragm. When the diaphragm 400 is a double diaphragm, the first end 404 and the second end 406 may be sealed off such that the diaphragm 400 forms a partition 402. Within the diaphragm 400, a plurality of flat sheets 408 may be placed. The diaphragm 400 may also have a variety of additional elements which can assist with the manufacturing or methods of manufacturing articles according to the present disclosure. For example, the diaphragm 400 may include a heating element 410, a cooling element 412, or a curing element 414. The diaphragm 400 may also have a vacuuming element 416 incorporated with it. The vacuuming element 416 may be particularly useful as several processes such as infusion of the plurality of flat sheets 408 may be aided by forming or maintaining a vacuum within the diaphragm. By incorporating separate elements with the diaphragm 400, the overall number of tools required in the manufacturing process may be reduced, and the speed and efficiency of the overall manufacturing process may be increased.

By incorporating a heating element 410 with the diaphragm 400 specifically, the individual layers of sheets composing the plurality of flat sheets 408 may be more moveable in relation to each other. This is especially helpful when the plurality of flat sheets 408 is infused with a matrix 502 (see FIG. 25) but curing or forming of the plurality of flat sheets 408 has yet to be performed at this particular stage. By applying heat to the plurality of flat sheets 408, the viscosity of the matrix 502 may be reduced allowing the individual layers of sheets to move more freely in relation to each other. Further, by incorporating a heating element 410 into the diaphragm 400 directly, as opposed to having the heating element 410 be separate from the diaphragm 400, more direct heat may be applied to the plurality of flat sheets 408.

Moreover, by incorporating a cooling element 412 within the diaphragm 400 specifically, the temperature of the plurality of flat sheets 408 may be reduced when needed. For example, if it is desired for the plurality of flat sheets 408 to be kept at an elevated temperature such that the individual flat sheets move more freely in relation to each other, the heating element 410 discussed above may be utilized. This is especially important if and after the plurality of flat sheets 408 are infused with a matrix 502 (see FIG. 25). However, if the temperature of the plurality of flat sheets 408 is elevated too high, the plurality of flat sheets 408 may undesirably cure and harden before the article is formed into the correct shape or before any time other than intended. Thus, by incorporating a cooling element 412, the temperature may be prevented from exceeding the threshold in which curing or hardening occurs while also maintaining the plurality of flat sheets 408 at an elevated temperature where the individual flat sheets move more freely in relation to each other. Further, if the heating element 410 is also to be used, the cooling element 412 may also be capable of assisting in increasing or controlling the speed at which the step of curing is completed by reducing the temperature of the plurality of flat sheets 408 such that the matrix hardens or solidifies.

Turning to the plurality of flat sheets 408 which may be utilized in embodiments of the present disclosure, the plurality of flat sheets 408 may be composed of a specific material. For example, the material may be a reinforcement material. For example, the plurality of flat sheets may be composed of a glass fiber, a carbon fiber, an aramid, a basalt, a natural fiber (e.g., hemp, sisal, etc.), a polyethylene, a polypropylene, or combinations thereof. Further, the plurality of flat sheets 408 may be an uncured material. Alternatively, the plurality of flat sheets 408 may be a pre-cured material prior to being placed within the diaphragm 400 or processed according to the methods of the present disclosure. The plurality of flat sheets 408 may also be prefabricated before they are placed within the diaphragm 400 and processed according to the methods of the present disclosure. Furthermore, the plurality of flat sheets 408 may be any number of other suitable materials such as thermoplastic materials, thermoset materials that become a thermoplastic material upon curing, or a combination of thermoplastic materials or thermoset materials.

Depending on the type of materials the plurality of flat sheets 408 is formed of, the methods of the present disclosure may be altered accordingly to suit the material or the desired product from the process. For example, if the plurality of flat sheets 408 was made from a fiber-reinforced polymer material, then the infusion of the plurality of flat sheets 408 with a matrix 502 (see FIG. 25) may not be necessary. The exclusion of the infusion step may also apply when the plurality of flat sheets 408 is made out of sheets that are pre-impregnated with a matrix. Alternatively, if the plurality of flat sheets 408 is formed from a laminate of dry or bonded fiber material, the step of infusion of the plurality of flat sheets 408 with a matrix 502 may be performed either before, during, or after the step of forming the plurality of flat sheets 408 into the outer shape of an article 702 (see FIG. 27(C)).

Figure 25:
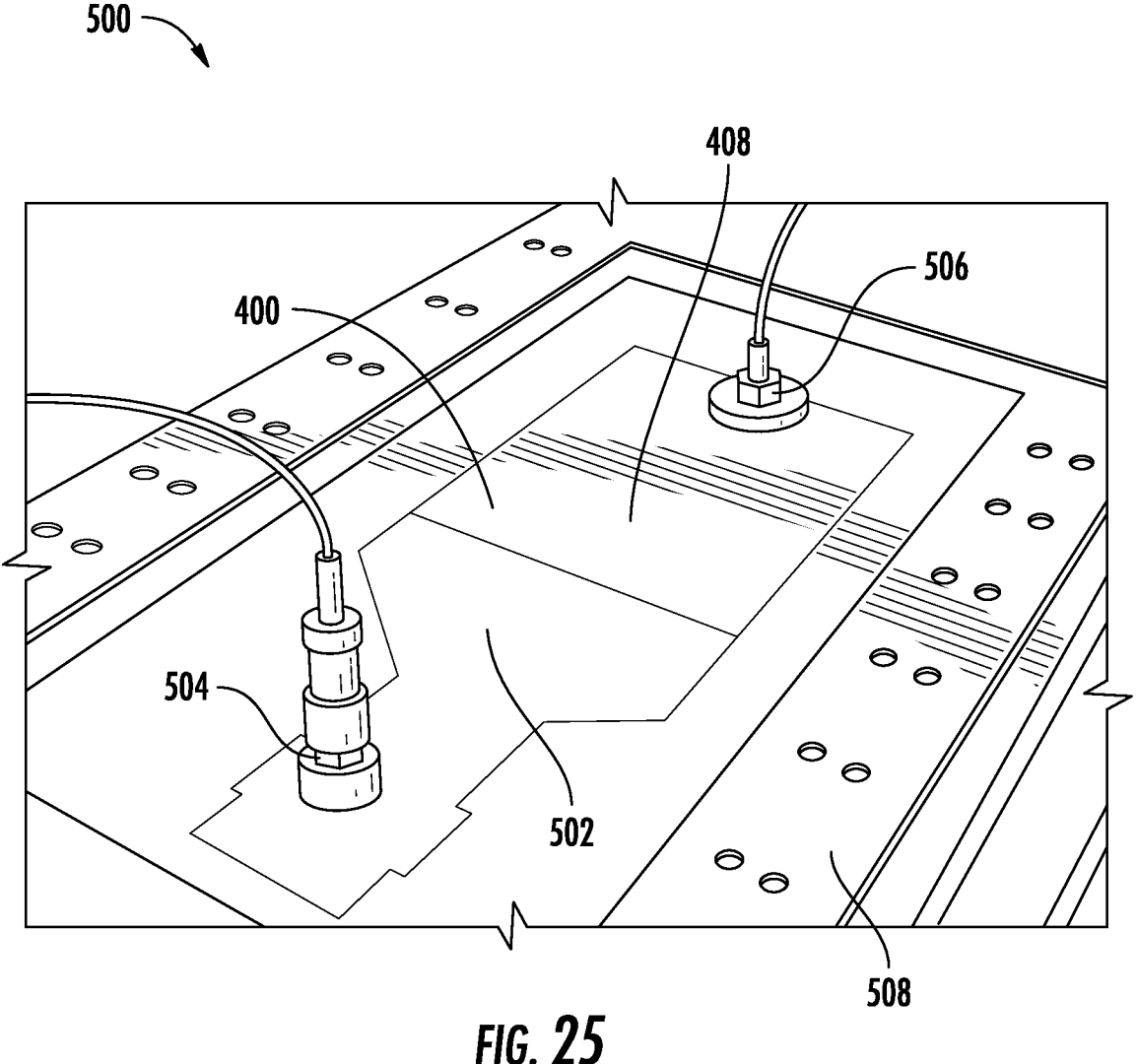
FIG. 25 illustrates an embodiment of an infusion apparatus that may be used to infuse the plurality of flat sheets of FIG. 24 according to the present disclosure.

Referring now to FIG. 25, an embodiment of an infusion apparatus that may be used to infuse the plurality of flat sheets of FIG. 24 is illustrated. As shown, the infusion apparatus 500 may be capable of dispensing a matrix 502 via a matrix dispensing apparatus 504. In addition, the infusion apparatus 500 may also have a vacuuming element 506. The vacuuming element 506 of the infusion apparatus 500 or the vacuuming element 416 of the diaphragm 400 may allow for the matrix 502 to be more readily infused within the plurality of flat sheets 408. For example, by forming a vacuum within the diaphragm 400, a smaller pressure value will exist within the diaphragm 400 when compared to an exterior environment. When the matrix 502 is introduced, the matrix will have a higher-pressure value, similar to the exterior environment, and a pressure differential will be created between the high-pressure value matrix 502 and the low-pressure interior of the diaphragm 400. As a result of this pressure differential, the matrix will flow towards the low-pressure value of the interior of the diaphragm 400. The vacuuming element 506 of the infusion apparatus 500 can then maintain the pressure differential in the interior of the diaphragm 400 which will pull the matrix 502 having a higher-pressure value to the lower pressure value created by the vacuuming element 506. The vacuuming element 506 can be selectively placed so that the matrix is pulled to a region where the plurality of sheets of material 408 is found. In doing this, the matrix 502 may be directly pulled into the plurality of flat sheets 408. In utilizing either vacuuming elements 416, 506 in this manner, the amount of overall matrix 502 required to properly infuse the plurality of flat sheets 408 may be reduced. Further, the speed at which the infusion process is conducted may be increased.

Returning to the infusion apparatus generally, the infusion apparatus 500 and infusion process may be found/occur on a layup table 508. Alternatively, the infusion process could also be performed on a tooling device 600 (see FIG. 26). If, however, the infusion process is performed on a layup table 508, it may be useful to maintain a vacuum within the diaphragm 400 even after the infusion process is complete. For example, if a vacuum is maintained within the diaphragm 400 after the infusion process, the diaphragm 400 and the plurality of flat sheets 408 may be more easily transported from the layup table 508 to the tooling device 600 for later forming of the article.

Turning to the matrix 502 used in the infusion process, the matrix 502 may be any material capable of forming an article with or without curing. For example, the matrix 502 may be a resin material, the resin material comprising a thermoplastic resin, a thermoset resin that becomes a thermoplastic material after curing, or combinations thereof. During the manufacturing process, the plurality of flat sheets 408 may be infused with a matrix 502 either before the plurality of flat sheets 408 are formed into a desired outer shape of an article 702 (see FIG. 27(C)) or after the plurality of flat sheets are already formed into a desired shape.

Referring now to FIG. 26 and FIG. 27(A)-(D), a tooling device that may be used to form the diaphragm or the plurality of flat sheets of FIG. 24 is illustrated. The tooling device 600 may be a static tooling device with a surface or alternatively, the tooling device 600 may be an adaptable tooling device with a bed 606 having a perimeter 616. For example, if the tooling device 600 is an adaptable tooling device, the tooling device may have an actuator 602 which is capable of driving a rod 604 that lifts the bed 606 of the tooling device 600 at one particular point. Further, by placing multiple similar actuators 602 throughout the area of the tooling device 600, the bed 606 of the tooling device 600 may be selectively elevated and set to a desired shape. This benefit may be particularly useful when forming the diaphragm 400 into a desired outer shape. For example, the tooling device 600 may be operated to set a shape for the bed 606 before the diaphragm 400 containing the plurality of flat sheets 408 is placed. Alternatively, the tooling device may be operated to a shape for the bed 606 after the diaphragm is placed. One benefit of setting the shape of the bed 606 before the diaphragm is placed is that this step may be performed while other steps are taking place such as the infusion process. This may lead to reduced manufacturing time and increased efficiency.

Like the diaphragm 400 discussed in reference to FIG. 24, the tooling device 600 may also have separate additional elements incorporated with it. For example, the tooling device 600 may have a heating element 608, a cooling element 610, a curing element 612, or a vacuuming element 614. By incorporating these separate elements directly with the tooling device 600, the overall number of tools required in the manufacturing process may be reduced, and the speed and efficiency of the overall manufacturing process may be increased.

Similar to the benefits of incorporating a heating element 410 into the diaphragm 400, incorporating a heating element 608 into the tooling device 600 may allow for the individual layers of sheets composing the plurality of flat sheets 408 to be more moveable in relation to each other, especially after the plurality of flat sheets 408 have been infused with a matrix 502. One benefit of directly incorporating the heating element 608 with the tooling device 600, specifically, is that more direct heat may be applied to a diaphragm 400 resting upon the tooling device 600 as opposed to having an external heating source.

Furthermore, similar to the cooling element 412 discussed as being integrated with the diaphragm 400, the cooling element 610 incorporated with the tooling device 600 may also provide similar benefits. For example, like the cooling element 412 of the diaphragm 400, the cooling element 610 of the tooling device 600 may be capable of assisting in the control of the temperature of the diaphragm 400 when the diaphragm 400 is placed upon the tooling device 600 for forming. Further, like the cooling element 412 of the diaphragm 400, a controlled temperature is especially important if and after the plurality of flat sheets 408 are infused with a matrix 502 to prevent the matrix from curing and hardening too early or at an undesired time. Thus, by incorporating a cooling element 610 into the tooling device, the temperature may be prevented from exceeding the threshold in which curing or hardening occurs while also maintaining the plurality of flat sheets 408 at an elevated temperature where the individual flat sheets move more freely in relation to each other so that they may be formed more easily by the tooling device 600.

One unique benefit of incorporating a vacuuming element 614 into the tooling device 600 is that forming may be greatly assisted by an additional vacuuming element 614. For example, by including a vacuuming element 614 with the tooling device 600, the process of vacuum forming may be performed in addition to the forming achieved by the forming of the adaptable tooling or other tooling methods which may be provided. This particular multimethod forming process will be discussed further below.

Figure 26:
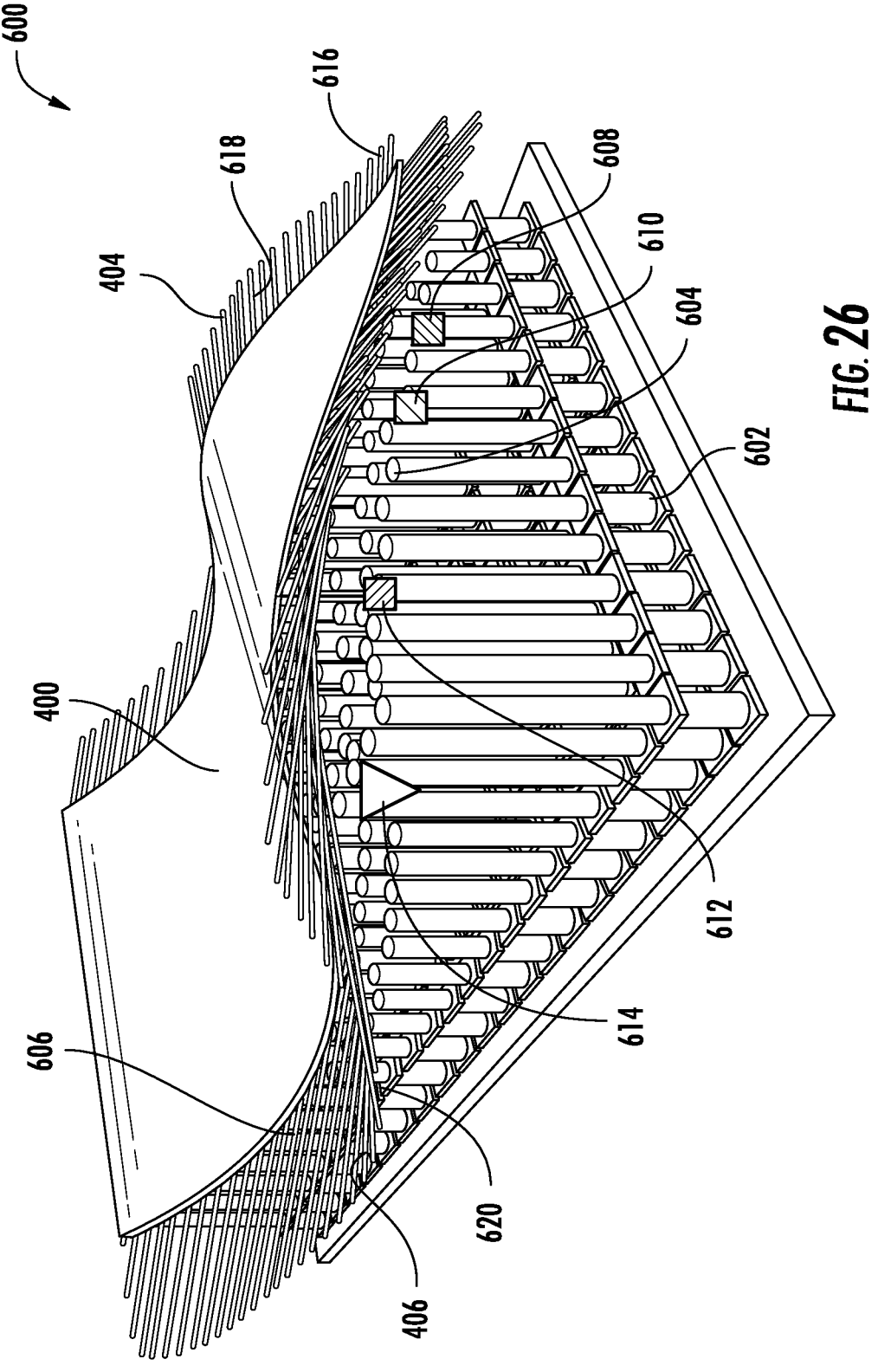
FIG. 26 illustrates a tooling device that may be used to form the diaphragm or the plurality of flat sheets of FIG. 24 according to the present disclosure.

Referring now to FIG. 27(A)-(D), a view of the tooling device of FIG. 26 forming the diaphragm and the plurality of flat sheets of FIG. 24 is illustrated. As shown, the tooling device 600 may be configured to form the plurality of flat sheets 408 into an outer shape of an article 702. As previously mentioned, one particular way the tooling device 600 may be able to form an outer shape of the article 702 is through the use of a vacuuming element 614 with other tooling means. For example, the other tooling means may be the adaptable tooling device as discussed above.

In particular, when the tooling device 600 is an adaptable tooling device, the diaphragm 400 may be formed into the outer shape of the article 702 by affixing the first end 404 of the diaphragm 400 on one side 618 of the perimeter 616 of the tooling device 600 and affixing the second end 406 of the diaphragm 400 on an opposite side 620 if the perimeter 616 of the tooling device 600. Once the first end 404 and the second end 406 are affixed to the tooling device 600, the tooling device 600 may be operated such that the first end 404 and the second end 406 are stretched into a desired outer shape of the article 702. The vacuuming element 614 may then be used to further stretch the plurality of flat sheets 408 within the diaphragm 400 to a desired outer shape of the article 702. Alternatively, the vacuuming element 614 may also be used in conjunction with the initial stretching of the first end 404 and the second end 406 by the tooling device 600 to assist in the forming of the outer shape of the article 702. The vacuuming element 614 may be capable of achieving these benefits by creating a pressure differential within the diaphragm 400. For example, the vacuuming element 614 may reduce the pressure value around a particular point of the diaphragm 400 when compared to the overall environmental pressure. As a result of the pressure value being reduced when compared to the environmental pressure, the air found in the unaffected areas may move toward the created area of lower pressure value around the vacuuming element 614. This movement will create a force that can be used alone or in conjunction with the other features of the tooling device 600 to form the plurality of flat sheets 408 into an outer shape of an article 702.

Once the outer shape of the article 702 is formed, the plurality of flat sheets 408 may be cured and the diaphragm 400 may be removed so that the article 704 may be retrieved. Curing of the plurality of flat sheets 408 may be achieved by either the heating, cooling, or curing elements 410, 412, 414 of the diaphragm 400 or the heating, cooling, or curing elements 608, 610, 612 of the tooling device 600. For example, either heating elements 410, 608 may generate a high enough heat such that the matrix 502 infused into the plurality of flat sheets 408 is hardened. Alternatively, either cooling elements 412, 610 may reduce the temperature to a low enough threshold such that the matrix 502 infused into the plurality of flat sheets 408 is hardened. The cooling elements 412, 610 may also be used with the heating elements 410, 608 to heat the matrix 502 such that it begins hardening and then cool the matrix 502 to complete the hardening process. The curing elements 414, 612 may also operate in conjunction with the heating elements 410, 608, or the cooling elements 412, 610. Further, the curing element 414, 612 may be an additional heating or curing element. Alternatively, the curing elements 414, 612 may be other curing means separate from heating or cooling. For example, the curing elements 414, 612 may be a light, such as an ultraviolet ("UV") light. The UV light may be capable of curing the matrix 502 infused into the plurality of flat sheets 408 by triggering a photochemical reaction within the matrix 502 that causes the matrix 502 to harden.

Further, it should be understood that although the heating elements 410, 608, the cooling elements 412, 610, or the curing elements 414, 612 may be incorporated directly with the diaphragm 400 or the tooling device 600 respectively, the heating elements 410, 608, the cooling elements 412, 610, or the curing elements 414, 612 may also external to the diaphragm 400 or the tooling device 600 instead. For example, external heat, external cooling, or external means of curing may be applied to the diaphragm 400 such that the matrix 502 infused plurality of flat sheets 408 are cured.

Referring now to FIG. 28, a flow diagram of another embodiment of a method of forming an article is illustrated. As shown at (802), the method 800 includes providing a diaphragm forming a partition. Further, as shown at (804), the method 800 includes placing a plurality of flat sheets within the diaphragm. As shown at (806), the method 800 further includes forming the plurality of flat sheets together into an article. As shown at (806A), forming the plurality of flat sheets together into an article (806) may include infusing the plurality of flat sheets with a matrix. As shown at (806B), forming the plurality of flat sheets together into an article (806) may further include forming the plurality of flat sheets in a tooling device to form an outer shape of the article. As shown at (806C), forming the plurality of flat sheets together into an article (806) may still further include securing each of the plurality of flat sheets together to form the article. It should be noted that although the aforementioned steps of the method 800 are mentioned in a specific order, the steps of the method 800 should not be construed as being restricted to a specific order.

In addition, the method 800 may be further modified. For example, the step of infusing the plurality of flat sheets with the matrix (806A) may occur prior to or after the step of forming the plurality of flat sheets in the tooling device to form the outer shape of the article (806B). In another example, the step of infusing the plurality of flat sheets with the matrix (806A) may be performed on a layup table. In yet another example, the step of forming the plurality of flat sheets together into the article (806) may further include an additional step of transferring the diaphragm from the layup table to the tooling device. In still another example, the step of forming the plurality of flat sheets together into the article (806) further includes an additional step of forming a vacuum within the diaphragm. The vacuum within the diaphragm may then be maintained while the plurality of flat sheets is infused with the matrix and the diaphragm is transferred from the layup table to the tooling device.

In a further example, the step of forming the plurality of flat sheets together into the article (806) may further include the step of setting the tooling device to a desired shape prior to the step of transferring the diaphragm from the layup table to the tooling device. In another further example, the step of forming the plurality of flat sheets in the tooling device to form the outer shape of the article (806) may further include creating a pressure differential within the diaphragm via a vacuuming element or applying an exterior force to the diaphragm after the tooling device is set to the desired shape. The exterior force may be a variety of implements or methods. For example, the exterior force may be a manufacturer or operator applying force directly. The exterior force could also be a weighted bag, block, or another form of weight that could be placed on the diaphragm. The exterior force may also be a vacuum chamber capable of the application of positive pressure onto the diaphragm by enclosing the volume surrounding the tooling device and diaphragm and increasing the pressure within the enclosed volume surrounding the tooling device and diaphragm.

In another example, the step of forming the plurality of flat sheets together into the article (806) may further include an additional step of affixing a first end of the diaphragm onto one side of a perimeter of the tooling device and affixing a second end of the diaphragm onto an opposing side of the perimeter of the tooling device. If the first and second ends are to be affixed, the step of forming the plurality of flat sheets together into the article (806) may further include another additional step of operating the tooling device such that the first end and the second end of the diaphragm are pulled and the plurality of flat sheets is stretched to a desired outer shape of the article.

In yet another example, the step of securing each of the plurality of flat sheets together to form the article may include heating, curing, or cooling of the plurality of flat sheets.

Figure 29:
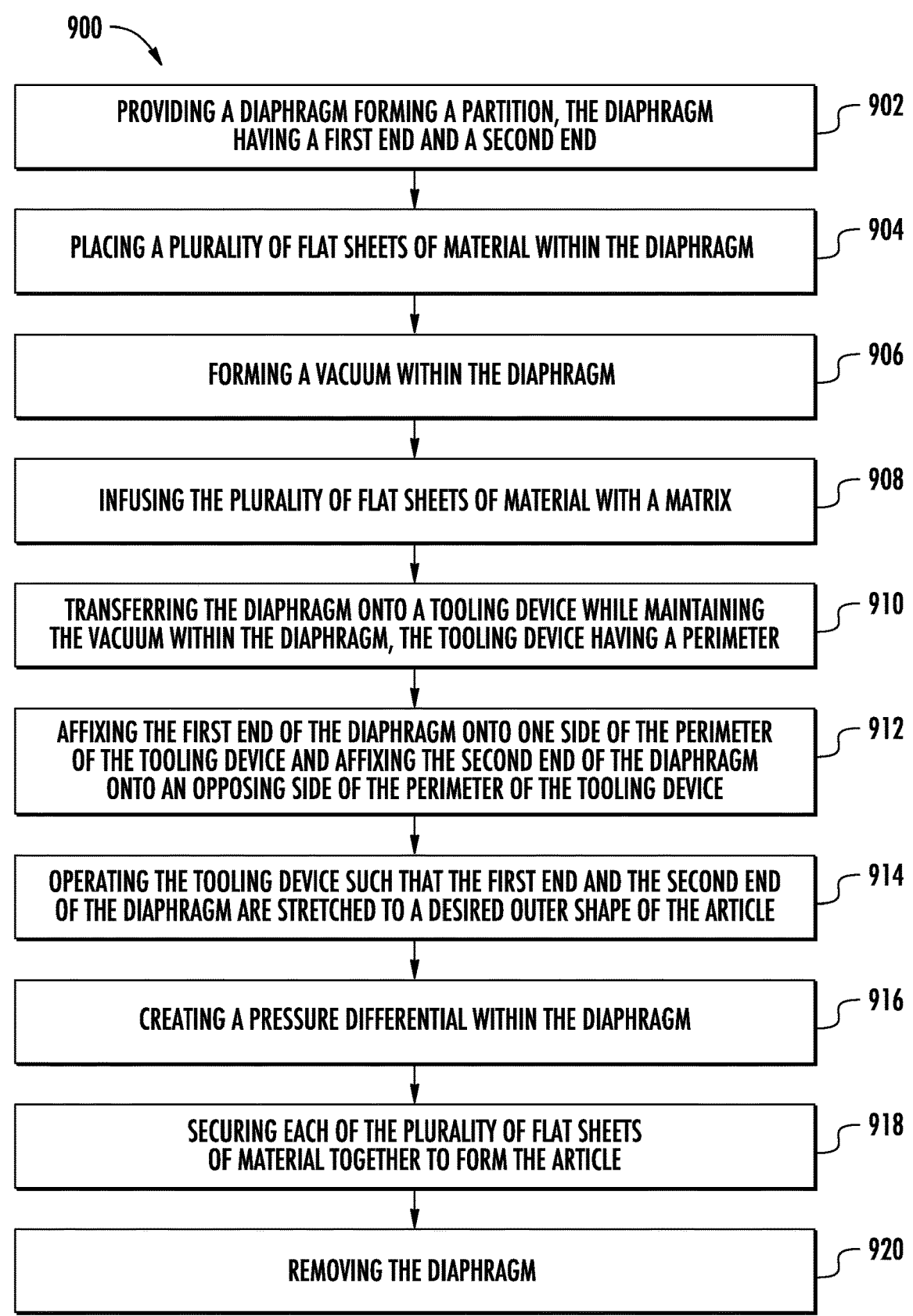
FIG. 29 illustrates a flow diagram of yet another embodiment of a method of forming an article according to the present disclosure.

Referring now to FIG. 29, a flow diagram of yet another embodiment of a method of forming an article is illustrated. As shown at (902), the method 900 includes providing a diaphragm forming a partition, the diaphragm having a first end and a second end. As shown at (904), the method 900 further includes placing a plurality of flat sheets of material within the diaphragm. As shown at (906), the method 900 further still includes forming a vacuum within the diaphragm. As shown at (908), the method 900 also includes infusing the plurality of flat sheets of material with a matrix. As shown at (910), the method 900 includes transferring the diaphragm onto a tooling device while maintaining the vacuum within the diaphragm, the tooling device having a perimeter. As shown at (912), the method 900 further includes affixing the first end of the diaphragm onto one side of the perimeter of the tooling device and affixing the second end of the diaphragm onto an opposing side of the perimeter of the tooling device. As shown at (914), the method 900 also includes operating the tooling device such that the first end and the second end of the diaphragm are stretched to a desired outer shape of the article. As shown at (916), the method 900 further still includes creating a pressure differential within the diaphragm. As shown at (918), the method 900 still further includes securing each of the plurality of flat sheets of material together to form the article. As shown at (920), the method 900 includes removing the diaphragm so that the article may be retrieved. Similar to the method 800, it should be noted that although the aforementioned steps of the method 900 are mentioned in a specific order, the steps of the method 900 should not be construed as being restricted to a specific order.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing a rotor blade shell, the method comprising:

forming a continuous sheet of fiber-reinforced polymer material using a continuous process;

forming a plurality of flat sheets from the continuous sheet of fiber-reinforced polymer material by cutting the continuous sheet into the plurality of flat sheets to a predetermined size;

forming the plurality of flat sheets of the fiber-reinforced polymer material into a plurality of curved sheets of the fiber-reinforced polymer material;

after forming the plurality of flat sheets of the fiber-reinforced polymer material into the plurality of curved sheets of the fiber-reinforced polymer material, assembling the plurality of curved sheets of the fiber-reinforced polymer material in a mold assembly of the rotor blade shell to form an outer shape of the rotor blade shell;

positioning a shear web in the mold assembly along with assembling the plurality of curved sheets of the fiber-reinforced polymer material, wherein the shear web comprises a flexible, Y-shaped configuration having legs with inward-extending feet;

providing an adhesive on the inward-extending feet such that, when the mold assembly is closed, the legs flex outward to reduce a gap tolerance between the inward-extending feet and the rotor blade shell, wherein, upon curing, the adhesive secures the shear web in place; and securing each of the plurality of curved sheets of the fiber-reinforced polymer material together to form the rotor blade shell.

2. The method of claim 1, wherein the plurality of flat sheets of fiber-reinforced polymer material are constructed of a plurality of layers of laminates.

3. The method of claim 1, further comprising utilizing waste material from the cutting of the plurality of flat sheets of fiber-reinforced polymer material to form one or more reinforcements for the rotor blade shell.

4. The method of claim 1, further comprising forming the plurality of flat sheets of the fiber-reinforced polymer material into the plurality of curved sheets of the fiber-reinforced polymer material using at least one of a thermoforming process, rolling, or curve forming.

5. The method of claim 4, further comprising adding at least one of one or more layers and one or more reinforcements to the plurality of flat sheets of the fiber-reinforced polymer material before forming the plurality of flat sheets of the fiber-reinforced polymer material into the plurality of curved sheets of the fiber-reinforced polymer material.

6. The method of claim 5, wherein the one or more reinforcements comprises at least one of ribs, stringers, sub frames, core material, or combinations thereof.

7. The method of claim 5, further comprising utilizing at least one of automated tape laying, automated fiber placement, a pick and place method, or combinations thereof for adding at least one of one or more layers and one or more reinforcements to the plurality of flat sheets of the fiber-reinforced polymer material.

8. The method of claim 5, wherein adding at least one of one or more layers and one or more reinforcements to the plurality of flat sheets of the fiber-reinforced polymer material comprises at least one of inline infusion, use of offline manufactured b-staged pre-impregnated fiber material, use of offline manufactured fully-cured pre-impregnated fiber material, use of dry fiber material infused at a later stage, or combinations thereof.

9. The method of claim 1, further comprising adding at least one of one or more layers and one or more reinforcements to the plurality of curved sheets of the fiber-reinforced polymer material.

10. The method of claim 9, further comprising utilizing at least one of automated tape laying, automated fiber placement, a pick and place method, or combinations thereof for adding at least one of one or more layers and one or more reinforcements to the plurality of curved sheets of the fiber-reinforced polymer material.

11. The method of claim 9, wherein adding at least one of one or more layers and one or more reinforcements to the plurality of curved sheets of the fiber-reinforced polymer material comprises at least one of inline infusion, use of offline manufactured b-staged pre-impregnated fiber material, use of offline manufactured fully-cured pre-impregnated fiber material, use of dry fiber material infused at a later stage, or combinations thereof.

12. The method of claim 1, wherein the mold assembly further comprises one or more securement aids for securing the plurality of curved sheets of the fiber-reinforced polymer material in place.

13. The method of claim 12, wherein the one or more securement aids of the mold assembly secures the plurality of curved sheets of the fiber-reinforced polymer material in place such that adjacent ends of the plurality of curved sheets of the fiber-reinforced polymer material overlap each other.

14. The method of claim 13, wherein the overlapping adjacent ends of the plurality of curved sheets of the fiber-reinforced polymer material comprise at least one of fasteners, rivets, interlocking features, spot welding, structural adhesives, or combinations thereof.

15. The method of claim 13, wherein securing each of the plurality of curved sheets of the fiber-reinforced polymer material together to form the rotor blade shell further comprises at least one of bonding the plurality of curved sheets of the fiber-reinforced polymer material together, welding the plurality of curved sheets of the fiber-reinforced polymer material together, or mechanically securing the plurality of curved sheets of the fiber-reinforced polymer material together via one or more fasteners or a tape laying process.

16. The method of claim 1, wherein the rotor blade shell is part of at least one of a wind turbine, an aircraft, or a watercraft.

* * * * *